US010774961B2

(12) United States Patent
Gibson et al.

(10) Patent No.: US 10,774,961 B2
(45) Date of Patent: Sep. 15, 2020

(54) COMPRESSION FITTING WITH TORQUE NUT

(71) Applicant: Parker-Hannifin Corporation, Cleveland, OH (US)

(72) Inventors: James David Gibson, Huntsville, AL (US); Adam K. Shin, Huntsville, AL (US)

(73) Assignee: Parker-Hannifin Corporation, Cleveland, OH (US)

(*) Notice: Subject to any disclaimer, the term of this patent is extended or adjusted under 35 U.S.C. 154(b) by 1196 days.

(21) Appl. No.: 14/963,724

(22) Filed: Dec. 9, 2015

(65) Prior Publication Data
US 2016/0091126 A1  Mar. 31, 2016

Related U.S. Application Data

(63) Continuation-in-part of application No. PCT/US2015/034208, filed on Jun. 4, 2015.
(Continued)

(51) Int. Cl.
*F16L 19/10* (2006.01)
*F16L 19/12* (2006.01)

(52) U.S. Cl.
CPC ............ *F16L 19/10* (2013.01); *F16L 19/103* (2013.01); *F16L 19/12* (2013.01); *F16L 2201/10* (2013.01)

(58) Field of Classification Search
CPC ......... F16L 19/10; F16L 19/103; F16L 19/12; F16L 2201/10; F16L 19/0243
(Continued)

(56) References Cited

U.S. PATENT DOCUMENTS

| 1,143,815 A | 6/1915 | Duffy |
| 1,334,130 A | 3/1920 | Blanchard |

(Continued)

FOREIGN PATENT DOCUMENTS

| AU | 2005200125 A1 | 2/2005 |
| BR | 0207034 A | 2/2005 |

(Continued)

OTHER PUBLICATIONS

International Search Report for parent application No. PCT/US2015/034208 dated Oct. 9, 2015.

*Primary Examiner* — David Bochna
*Assistant Examiner* — James A Linford
(74) *Attorney, Agent, or Firm* — Renner, Otto, Boisselle & Sklar, LLP

(57) ABSTRACT

A torque nut with an axially deformable projection protruding from the axially inner end face of the torque nut. The torque nut may be assembled as part of a compression fitting including one or more ferrules for engaging a tube held within the torque nut and a fitting body onto which the torque nut can be threaded. The axially deformable projection will engage an opposing face on the fitting body and this allows a person tightening the torque nut to to feel when the torque nut is madeup to prevent undermaking or overmaking the torque nut. When the axially deformable projection engages the fitting body, there will be an abrupt increase in torque needed to tighten the torque nut on the fitting body after only partial axial deformation of the axially deformable projection relative to the axially inner end face of the torque nut.

19 Claims, 19 Drawing Sheets

Related U.S. Application Data

(60) Provisional application No. 62/007,432, filed on Jun. 4, 2014.

(58) Field of Classification Search
USPC .................................. 285/248, 249, 247, 93
See application file for complete search history.

(56) References Cited

U.S. PATENT DOCUMENTS

| | | |
|---|---|---|
| 1,595,310 A | 8/1926 | Mueller et al. |
| 2,377,891 A | 6/1945 | Laue |
| 2,405,822 A | 8/1946 | Franck |
| 2,508,763 A | 5/1950 | Mercier |
| 2,511,134 A | 6/1950 | Stranberg |
| 2,544,109 A | 3/1951 | Richardson |
| 2,561,648 A | 7/1951 | Bradley |
| 2,768,845 A | 10/1956 | Samiran |
| 2,904,355 A | 9/1959 | Creamer |
| 3,039,796 A | 6/1962 | Lawman |
| 3,139,293 A | 6/1964 | Franck |
| 3,248,136 A | 4/1966 | Brozek et al. |
| 3,365,219 A | 1/1968 | Nicolaus |
| 3,441,297 A | 4/1969 | Koski |
| 3,445,128 A | 5/1969 | Teeters |
| 3,521,912 A | 7/1970 | Maurer |
| 3,684,322 A | 7/1972 | Kotsakis |
| 3,695,647 A | 10/1972 | Pugliese |
| 3,773,169 A | 11/1973 | Zahuranec et al. |
| 3,848,905 A | 11/1974 | Hammer et al. |
| 3,879,070 A | 4/1975 | Russ |
| 4,136,897 A | 1/1979 | Haluch |
| 4,422,673 A | 12/1983 | Blackford et al. |
| 4,475,748 A | 10/1984 | Ekman |
| 4,568,114 A | 2/1986 | Konrad |
| 5,074,599 A | 12/1991 | Wirbel et al. |
| 5,149,148 A | 9/1992 | Taeuber, Jr. et al. |
| 5,280,967 A | 1/1994 | Varrin, Jr. |
| 5,351,998 A | 10/1994 | Behrens et al. |
| 5,622,393 A | 4/1997 | Elbich et al. |
| 5,882,050 A | 3/1999 | Williams et al. |
| 5,921,588 A | 7/1999 | Vogel et al. |
| 6,109,660 A | 8/2000 | Akiyama et al. |
| 6,123,364 A | 9/2000 | Inoue et al. |
| 6,279,242 B1 | 8/2001 | Williams et al. |
| 6,502,323 B2 | 1/2003 | Williams et al. |
| 6,640,457 B2 | 11/2003 | Williams et al. |
| 6,641,180 B2 | 11/2003 | Udhoefer |
| 6,766,582 B2 | 7/2004 | Williams et al. |
| 6,860,514 B2 | 3/2005 | Wentworth et al. |
| 6,941,668 B2 | 9/2005 | Williams et al. |
| 7,002,077 B2 | 2/2006 | Pyron |
| 7,032,932 B2 | 4/2006 | Guest |
| 7,066,496 B2 | 6/2006 | Williams et al. |
| 7,108,288 B2 | 9/2006 | Bennett et al. |
| 7,194,817 B2 | 3/2007 | Williams et al. |
| 7,393,018 B2 | 7/2008 | Williams |
| 7,407,196 B2 | 8/2008 | Bennett et al. |
| 7,416,225 B2 | 8/2008 | Williams |
| 7,430,811 B2 | 10/2008 | Williams et al. |
| 7,497,483 B2 | 3/2009 | Williams et al. |
| 7,677,602 B2 | 3/2010 | Bennett et al. |
| 7,690,696 B2 | 4/2010 | Mallis et al. |
| 7,695,027 B2 | 4/2010 | Williams et al. |
| 7,740,283 B2 | 6/2010 | Bennett et al. |
| 7,762,592 B2 | 7/2010 | Williams |
| 7,815,226 B2 | 10/2010 | Williams |
| 8,038,180 B2 | 10/2011 | Williams et al. |
| 8,523,245 B2 | 9/2013 | Williams et al. |
| 8,813,348 B2 | 8/2014 | Williams et al. |
| 8,997,325 B2 | 4/2015 | Williams et al. |
| 9,016,732 B2 | 4/2015 | Bearer et al. |
| 2002/0148128 A1 | 10/2002 | Williams et al. |
| 2003/0197379 A1 | 10/2003 | Glover |
| 2004/0100097 A1 | 5/2004 | Fukano et al. |
| 2004/0212192 A1 | 10/2004 | Williams |
| 2005/0097763 A1 | 5/2005 | Williams et al. |
| 2005/0189134 A1 | 9/2005 | Pyron |
| 2005/0242582 A1 | 11/2005 | Williams et al. |
| 2009/0289452 A1 | 11/2009 | Bennett et al. |
| 2010/0213705 A1 | 8/2010 | Williams et al. |
| 2010/0219631 A1 | 9/2010 | Williams et al. |
| 2011/0006521 A1 | 1/2011 | Williams |
| 2011/0277309 A1* | 11/2011 | Bearer ................ F16L 19/061 29/525.03 |
| 2011/0298211 A1 | 12/2011 | Williams et al. |
| 2012/0005878 A1 | 1/2012 | Rubinski et al. |
| 2012/0043757 A1 | 2/2012 | Williams et al. |
| 2013/0147183 A1* | 6/2013 | Fukano ............... F16L 19/0283 285/93 |
| 2015/0101165 A1 | 4/2015 | Williams et al. |
| 2015/0233502 A1 | 8/2015 | Williams et al. |

FOREIGN PATENT DOCUMENTS

| | | |
|---|---|---|
| CA | 2384835 A1 | 3/2001 |
| CA | 2629361 A1 | 3/2001 |
| CA | 2437696 A1 | 8/2002 |
| CA | 2437710 A1 | 8/2002 |
| CA | 2532182 A1 | 3/2005 |
| CA | 25321821 A1 | 3/2005 |
| CA | 2580029 A1 | 3/2006 |
| CA | 2384835 C | 8/2008 |
| CN | 1390285 A | 1/2003 |
| CN | 1518651 A | 8/2004 |
| CN | 1836128 A | 9/2006 |
| CN | 1836129 A | 9/2006 |
| CN | 1916472 A | 2/2007 |
| CN | 1975229 A | 6/2007 |
| CN | 101018968 A | 8/2007 |
| CN | 100380042 C | 4/2008 |
| CN | 101245880 A | 8/2008 |
| CN | 1975229 A | 12/2009 |
| CN | 100564975 C | 12/2009 |
| CN | 101821541 A | 9/2010 |
| DE | 645775 C | 6/1937 |
| DE | 1775542 A1 | 7/1971 |
| DE | 2145760 A1 | 3/1973 |
| DE | 19607784 A1 | 10/1996 |
| DE | 19736765 A1 | 2/1999 |
| DE | 10206684 A1 | 8/2003 |
| DE | 60203879 T2 | 9/2005 |
| DE | 60034466 T2 | 1/2008 |
| DE | 112008002088 T5 | 9/2010 |
| DK | 112060 B | 11/1968 |
| EP | 0286568 A1 | 10/1988 |
| EP | 0899498 A2 | 3/1999 |
| EP | 1020675 A1 | 7/2000 |
| EP | 1358418 A2 | 11/2003 |
| EP | 1358419 A2 | 11/2003 |
| EP | 1471297 A2 | 10/2004 |
| EP | 1536175 A2 | 6/2005 |
| EP | 1271038 B1 | 8/2005 |
| EP | 1612467 A2 | 1/2006 |
| EP | 1654488 A1 | 5/2006 |
| EP | 2535631 A1 | 12/2012 |
| ES | 2238557 T3 | 9/2005 |
| GB | 384700 A | 12/1932 |
| GB | 981709 | 1/1965 |
| GB | 1361372 | 7/1974 |
| IL | 157248 B | 3/2008 |
| JP | 59-187184 A | 10/1984 |
| JP | 7243564 A | 9/1995 |
| JP | H07-024564 | 9/1995 |
| JP | 2004526911 A | 9/2004 |
| JP | 2005036946 | 2/2005 |
| JP | 2005246967 A | 9/2005 |
| JP | 2007502940 A | 2/2007 |
| JP | 2007502941 A | 2/2007 |
| JP | 2007120741 | 5/2007 |
| JP | 2007162742 | 6/2007 |
| JP | 2003074768 | 3/2008 |
| JP | 2008512628 A | 4/2008 |
| JP | 4128079 B2 | 7/2008 |
| JP | 4169745 B2 | 10/2008 |

(56) References Cited

FOREIGN PATENT DOCUMENTS

| | | | |
|---|---:|---|---:|
| JP | 4172935 | B2 | 10/2008 |
| JP | 2010535989 | A | 11/2010 |
| KR | 100859767 | B1 | 9/2008 |
| KR | 100861970 | B1 | 9/2008 |
| KR | 100861971 | B1 | 9/2008 |
| TW | 530142 | B | 5/2003 |
| TW | 539824 | B | 7/2003 |
| TW | 552369 | B | 9/2003 |
| WO | 01/20214 | A1 | 3/2001 |
| WO | 02063194 | A2 | 8/2002 |
| WO | 02063195 | A2 | 8/2002 |
| WO | WO02063195 | A2 | 8/2002 |
| WO | 2004/013527 | A2 | 2/2004 |
| WO | 2004013527 | A2 | 2/2004 |
| WO | 2005019716 | A1 | 3/2005 |
| WO | 2005019717 | A1 | 3/2005 |
| WO | 2005/106310 | | 11/2005 |
| WO | 2006031578 | A1 | 3/2006 |
| WO | 2008/057983 | A1 | 5/2008 |
| WO | 2009/02900 | A2 | 2/2009 |
| WO | 2009/020900 | A2 | 2/2009 |
| WO | 2010/129756 | A1 | 11/2010 |
| WO | 2011/099667 | A1 | 8/2011 |

\* cited by examiner

COMPRESSION FITTING WITH TORQUE NUT

RELATED APPLICATIONS

This application is a continuation-in-part of International Application No. PCT/US2015/034208 filed Jun. 4, 2015 in the English language, which claims the benefit of U.S. Provisional Application No. 62/007,432 filed Jun. 4, 2014, which are incorporated herein by reference.

TECHNICAL FIELD

The present disclosure relates generally to tube fittings, and more particularly to compression fittings with torque nuts.

BACKGROUND

Compression fittings are used in industrial systems to join various sections of fluid pathways together, for example to fluidly connect two separate tubes or pipes together. FIG. 1A shows a typical union compression fitting 20 including a left nut 22 and a right nut 24 attached to a body 26 to fluidly connect a left tube 28 with a right tube 30. The left side of the union compression fitting 20, shown in cross-section in FIG. 1C, illustrates the position of the left nut 22 prior to assembly. The right side of the union compression fitting 20 shows the position of the right nut 24 after makeup.

Often compression fittings employ a ferrule assembly to prevent leakage of hydraulic fluid. As shown in FIG. 1C, the union compression fitting may include a ferrule assembly, such as a single ferrule 32 or a dual ferrule assembly (not shown), for sealing against an outer surface of the tube 28 after makeup of the left nut 22. In short, the left nut 22 is threaded onto the body 26, and as the left nut 22 advances the ferrule 32 is pressed against the body 26. The geometry of the body 26 causes a radially inward compression of the ferrule 32 onto the outer surface of the tube 28. The right nut 24 (FIG. 1A) may be madeup in a similar fashion as the left nut 22, and a ferrule assembly (not shown) similar to the ferrule 32 may seal against an outer surface of the tube 30 upon makeup of the right nut 24. Typical makeup of fittings such as this requires advancing the nut 1¼ turns (or more) from the finger tight position. This usually requires marking the nut and body position or counting hex flats to insure proper initial assembly.

SUMMARY

The present disclosure provides a torque nut with an axially deformable projection protruding from the axially inner end face of the torque nut. The torque nut may be assembled as part of a compression fitting including one or more ferrules for engaging a tube held within the torque nut and a fitting body onto which the torque nut can be threaded. The axially deformable projection will engage an opposing face on the fitting body and this allows a person tightening the torque nut to feel when the torque nut is madeup to prevent undermaking or overmaking the torque nut. When the axially deformable projection engages the fitting body, there will be an abrupt increase in torque needed to tighten the torque nut on the fitting body after only partial axial deformation of the axially deformable projection relative to the axially inner end face of the torque nut. The abrupt increase in torque needed to tighten the torque nut indicates that the torque nut has been tightened sufficiently on the fitting body to seal the ferrule assembly to the tube. Thus, assembly time of the compression fitting may be reduced, leakage due to undermaking the compression fitting may be prevented, and component fatigue due to overmaking the compression fitting may be reduced.

A deformable portion of the torque nut may resist deformation, but deform during makeup of the torque nut. The axially deformable projection may be integral with a central body of the torque nut. For example, the axially deformable projection may be unitary (one-piece) with the central body.

In an embodiment, the axially deformable projection includes an insert that receives an axial projection of the torque nut such that the insert deforms radially as the axial projection is axially compressed.

In another embodiment, the axially deformable projection is an insert that is deformed axially between the central body and an axially inwardly facing shoulder of the fitting body.

In yet another embodiment, a sealing member is provided at a back (outer) end of the torque nut opposite the axially deformable projection at the inner end of the torque nut, the sealing member being configured to seal against an outer surface of a tube.

In a further embodiment, one or more stop collars may form the axially inwardly facing shoulder of the fitting body and the axially deformable projection. Each stop collar may protect the fitting body from damage and/or provide an indication regarding whether an associated fitting of torque nut is fully made-up or not.

Although generally illustrated as including a single ferrule-type assembly, the disclosure herein is equally applicable for multi-ferrule type assemblies, such a dual ferrule-type ferrule assembly.

The term "finger tight" is used herein to denote a torque nut tightened to a torque value anywhere from 10 inch-pounds (in-lb) to 50 in-lb, which may be based upon the size of the torque nut.

According to one aspect of the invention, a tube fitting assembly comprising a fitting body having an axially inner threaded end portion and a cavity opening to an axially inner end face of the fitting body for receiving an end of a tube, the fitting body having an axially inwardly facing shoulder radially offset from the axially inner threaded end portion, a ferrule assembly for sealing to the tube, the ferrule assembly and fitting body, when axially urged towards one another, having cooperating surfaces for radially inwardly compressing the ferrule assembly around to tube to form a seal with the tube, a torque nut having an axially inner threaded end portion in threaded engagement with the axially inner threaded end portion of the fitting body, the torque nut having a tube passageway extending from an axially outer end face of the torque nut to an axially inner end face of the torque nut, the tube passageway allowing for passage of a tube through the torque nut and into the fitting body, and the tube passageway having a shoulder operative to cause the ferrule assembly to be urged toward the fitting body when the torque nut is tightened onto the fitting body, and wherein the torque nut has integral therewith an axially deformable projection protruding from the axially inner end face of the torque nut, which axially deformable projection is radially offset from the axially inner threaded end portion of the torque nut in the same direction as the axially inwardly facing shoulder of the fitting body is radially offset from the axially inner threaded end portion of the fitting body such that upon tightening of the torque nut on the fitting body, an axially leading end of the axially deformable projection will axially move into engagement with the axially inwardly facing shoulder of the fitting body to cause an abrupt increase in torque needed to tighten the torque nut on the fitting body after only partial axial deformation of the axially deformable projection relative to the axially inner end face of the torque nut, the abrupt increase in torque needed to tighten the torque nut indicating that the torque nut has been tightened sufficiently on the fitting body to seal the ferrule assembly to the tube, and wherein the axially deformable projection is annularly continuous for forming a seal between the torque nut and the fitting body when the axially deformable projection is engaged with the fitting body.

According to another aspect of the invention, a tube fitting assembly comprising a fitting body having an axially inner threaded end portion and a cavity opening to an axially inner end face of the fitting body for receiving an end of a tube, the fitting body having an axially inwardly facing shoulder radially offset from the axially inner threaded end portion, a ferrule assembly for sealing to the tube, the ferrule assembly and fitting body, when axially urged towards one another, having cooperating surfaces for radially inwardly compressing the ferrule assembly around to tube to form a seal with the tube, a torque nut having an axially inner threaded end portion in threaded engagement with the axially inner threaded end portion of the fitting body, the torque nut having a tube passageway extending from an axially outer end face of the torque nut to an axially inner end face of the torque nut, the tube passageway allowing for passage of a tube through the torque nut and into the fitting body, and the tube passageway having a shoulder operative to cause the ferrule assembly to be urged toward the fitting body when the torque nut is tightened onto the fitting body, and wherein the torque nut has integral therewith an axially deformable projection protruding from the axially inner end face of the torque nut, which axially deformable projection is radially offset from the axially inner threaded end portion of the torque nut in the same direction as the axially inwardly facing shoulder of the fitting body is radially offset from the axially inner threaded end portion of the fitting body such that upon tightening of the torque nut on the fitting body, an axially leading end of the axially deformable projection will axially move into engagement with the axially inwardly facing shoulder of the fitting body to cause an abrupt increase in torque needed to tighten the torque nut on the fitting body after only partial axial deformation of the axially deformable projection relative to the axially inner end face of the torque nut, the abrupt increase in torque needed to tighten the torque nut indicating that the torque nut has been tightened sufficiently on the fitting body to seal the ferrule assembly to the tube, and wherein the abrupt increase in the torque is at least 40% greater than the increase in torque that otherwise would occur during tightening of the torque nut in the absence of the axially deformable projection.

According to another aspect of the invention, a torque nut for a tube fitting assembly that includes a fitting body having an axially inner threaded end portion and a cavity opening to an axially inner end face of the fitting body for receiving an end of a tube, the fitting body having an axially inwardly facing shoulder radially offset from the axially inner threaded end portion, and a ferrule assembly for sealing to the tube, the ferrule assembly and fitting body, when axially urged towards one another, having cooperating surfaces for radially inwardly compressing the ferrule assembly around to tube to form a seal with the tube, the torque nut having an axially inner threaded end portion in threaded engagement with the axially inner threaded end portion of the fitting body, the torque nut having a tube passageway extending from an axially outer end face of the torque nut to an axially inner end face of the torque nut, the tube passageway allowing for passage of a tube through the torque nut and into the fitting body, and the tube passageway having a shoulder operative to cause the ferrule assembly to be urged toward the fitting body when the torque nut is tightened onto the fitting body, and wherein the torque nut has integral therewith an axially deformable projection protruding from the axially inner end face of the torque nut, which axially deformable projection is radially offset from the axially inner threaded end portion of the torque nut such that upon tightening of the torque nut on the fitting body, an axially leading end of the axially deformable projection will axially move into engagement with the axially inwardly facing shoulder of the fitting body to cause an abrupt increase in torque needed to tighten the torque nut on the fitting body after only partial axial deformation of the axially deformable projection relative to the axially inner end face of the torque nut, the abrupt increase in torque needed to tighten the torque nut indicating that the torque nut has been tightened sufficiently on the fitting body to seal the ferrule assembly to the tube, and wherein the axially deformable projection is annularly continuous for forming a seal between the torque nut and the fitting body when the axially deformable projection is engaged with the fitting body.

According to another aspect of the invention, a torque nut for a tube fitting assembly that includes a fitting body having an axially inner threaded end portion and a cavity opening to an axially inner end face of the fitting body for receiving an end of a tube, the fitting body having an axially inwardly facing shoulder radially offset from the axially inner threaded end portion, and a ferrule assembly for sealing to the tube, the ferrule assembly and fitting body, when axially urged towards one another, having cooperating surfaces for radially inwardly compressing the ferrule assembly around to tube to form a seal with the tube, the torque nut having an axially inner threaded end portion in threaded engagement with the axially inner threaded end portion of the fitting body, the torque nut having a tube passageway extending from an axially outer end face of the torque nut to an axially inner end face of the torque nut, the tube passageway allowing for passage of a tube through the torque nut and into the fitting body, and the tube passageway having a shoulder operative to cause the ferrule assembly to be urged toward the fitting body when the torque nut is tightened onto the fitting body, and wherein the torque nut has integral therewith an axially deformable projection protruding from the axially inner end face of the torque nut, which axially deformable projection is radially offset from the axially inner threaded end portion of the torque nut such that upon tightening of the torque nut on the fitting body, an axially leading end of the axially deformable projection will axially move into engagement with the axially inwardly facing shoulder of the fitting body to cause an abrupt increase in torque needed to tighten the torque nut on the fitting body after only partial axial deformation of the axially deformable projection relative to the axially inner end face of the torque nut, the abrupt increase in torque needed to tighten the torque nut indicating that the torque nut has been tightened sufficiently on the fitting body to seal the ferrule assembly to the tube, and wherein the abrupt increase in the torque is at least 40% greater than the increase in torque that otherwise would occur during tightening of the torque nut in the absence of the axially deformable projection.

According to another aspect of the invention, a tube fitting assembly comprising a torque nut and a fitting body, a tube with an annular outer surface embraced by the torque nut and the fitting body, and at least one ferrule engaged by the torque nut and the fitting body to seal against the annular outer surface of the tube, the fitting body comprising an annular portion having an axially inner threaded end portion, and an axially facing shoulder for engaging the torque nut, the torque nut comprising an axially inner threaded end portion configured to engage the axially inner threaded end portion of the fitting body, the axially inner threaded end portion of the torque nut helically circumscribing a central axis of the torque nut, a first end of the torque nut, wherein the first end of the torque nut is configured to receive an annular portion of the fitting body, and an axially deformable projection having a base extending from the first end of the torque nut in a first axial direction to an axially leading end of the axially deformable projection, the axially deformable projection having a first axial length from the base to the axially leading end of the axially deformable projection, the base being entirely radially offset from the axially inner threaded end portion of the torque nut and the axially inner threaded end portion of the fitting body, the axially deformable projection having a deformable portion disposed radially offset from the axially inner threaded end portion of the torque nut and radially offset from the axially inner threaded end portion of the fitting body, wherein the axially deformable projection resists deformation upon the fitting body exerting an axial compressive force against the axially leading end when the axially leading end engages the fitting body, wherein the deformable portion is configured to plastically deform when compressed by the axially facing shoulder facing in a second direction to abut the axially leading end, the axially facing shoulder being axially fixed relative to the fitting body when the axially leading end engages the axially facing shoulder such that the deformable portion does not deform until the axially compressive force is at least 20% of an axial force necessary for the torque nut to axially urge the at least one ferrule into a madeup position to sealingly engage the annular outer surface of the tube, and wherein the axially deformable projection is removable from the fitting body, with the nut after the deformable portion is plastically deformed into a first position.

According to another aspect of the invention, a torque nut comprising axially inner threaded end portion configured to engage an axially inner threaded end portion of a fitting body, the axially inner threaded end portion of the torque nut helically circumscribing a central axis of the torque nut, a first end of the torque nut, wherein the first end of the torque nut is configured to receive an annular portion of the fitting body, and an axially deformable projection having a base extending from the first end of the torque nut in a first axial direction to an axially leading end of the axially deformable projection, the axially deformable projection having a first axial length from the base to the axially leading end of the axially deformable projection, the base being entirely radially offset from the axially inner threaded end portion of the torque nut, the axially deformable projection having a deformable portion disposed radially offset from the axially inner threaded end portion of the torque nut, wherein the deformable portion is axially offset from the axially leading end, and wherein the deformable portion is configured to plastically deform before any other portion of the torque nut upon an axial force being applied to the axially leading end of the axially deformable projection, wherein the axially deformable projection resists deformation upon an axial compressive force being applied to the axially leading end when the axially leading end engages the fitting body, wherein the deformable portion is configured to plastically deform when compressed by an axially facing shoulder facing in a second direction to abut the axially leading end such that the deformable portion does not deform until the axially compressive force is at least 20% of an axial force necessary for the torque nut to axially urge at least one ferrule, between the fitting body and the torque nut, into a madeup position to sealingly engage an annular outer surface of a tube held within the fitting body, and wherein the axially deformable projection is integral with the nut after the deformable portion is plastically deformed into a first position.

The foregoing and other features of the invention are hereinafter described in greater detail with reference to the accompanying drawings.

DETAILED DESCRIPTION

The principles of this present application have particular application to tube fittings that are made and remade multiple times, and thus will be described below chiefly in this context. It will be appreciated that principles of this disclosure may be applicable to other fittings where it is desirable to easily determine whether the fitting is properly made or remade. It will also be appreciated that use of the terms "left" or "right" is merely for illustrative purposes.

Figure 1A:
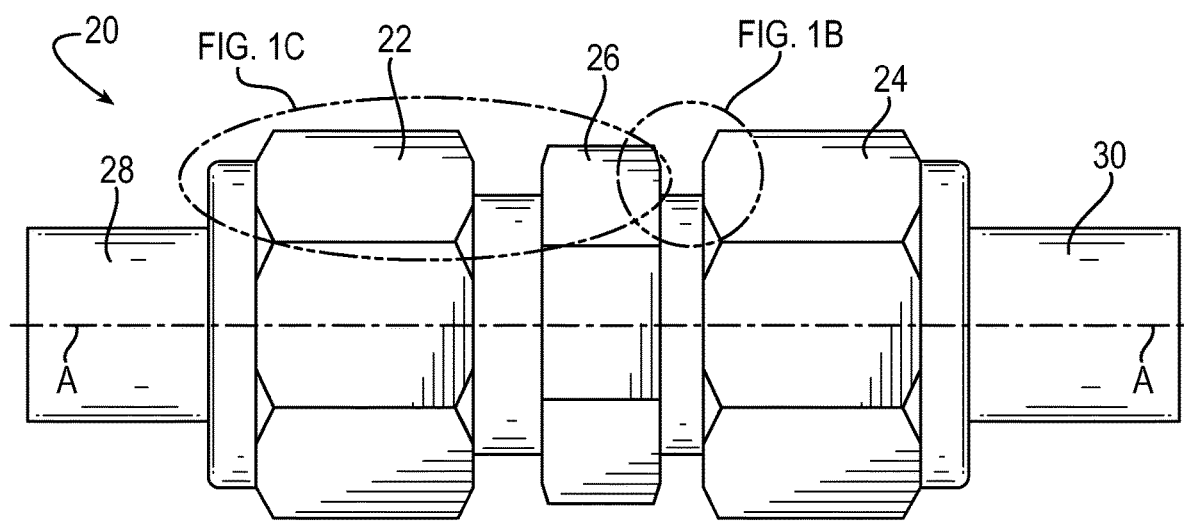
FIG. 1A is a front view of a prior art union compression fitting including a left nut and a right nut connected to a body.
Figure 1B:
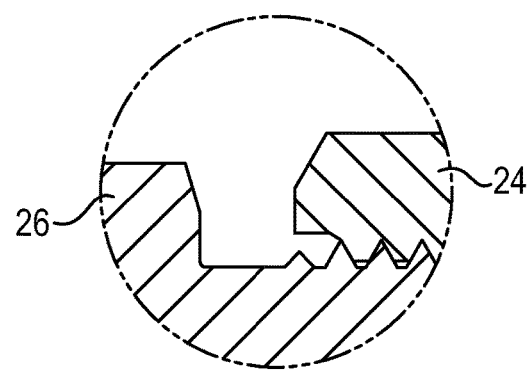
FIG. 1B is a front view of a partial cross-section of the union compression fitting of FIG. 1A with the right nut connected to the body in a madeup position.
Figure 1C:
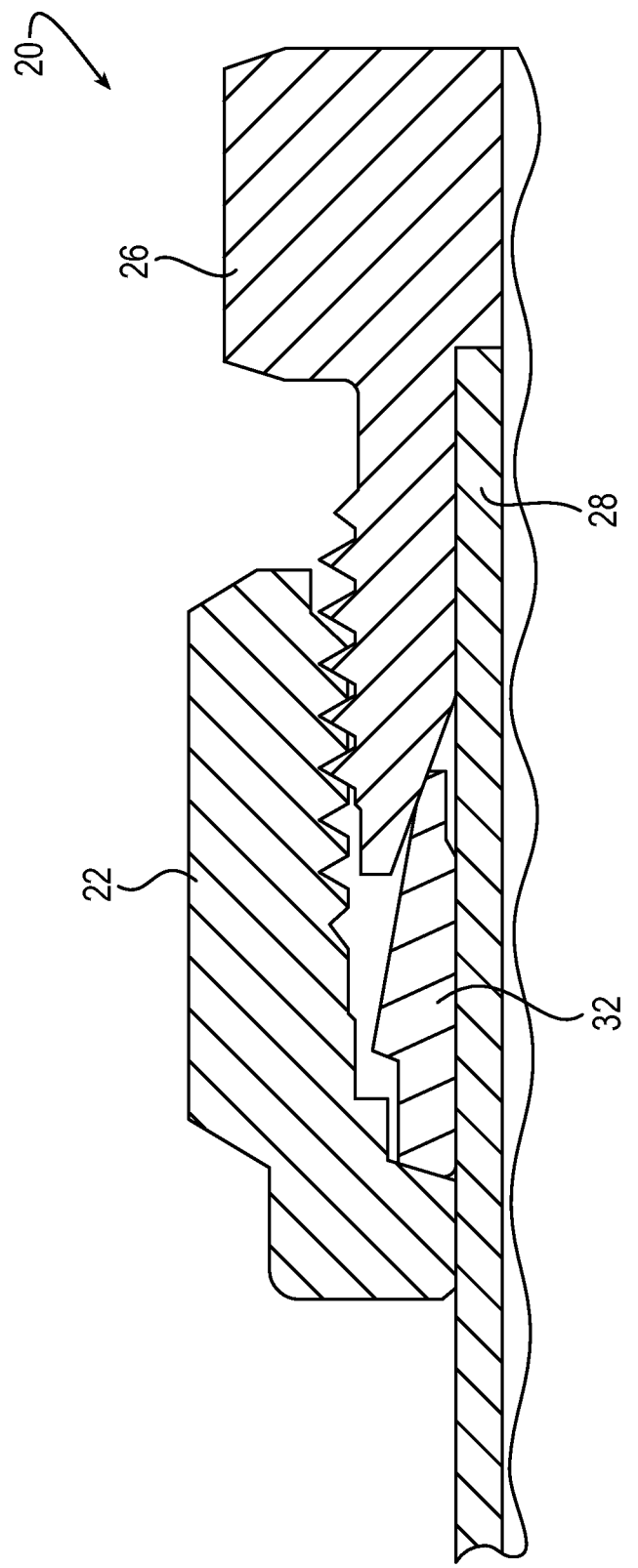
FIG. 1C is a front view of a partial cross-section of the union compression fitting of FIG. 1A with the left nut connected to the body in a finger tight position, prior to makeup.
Figure 2A:
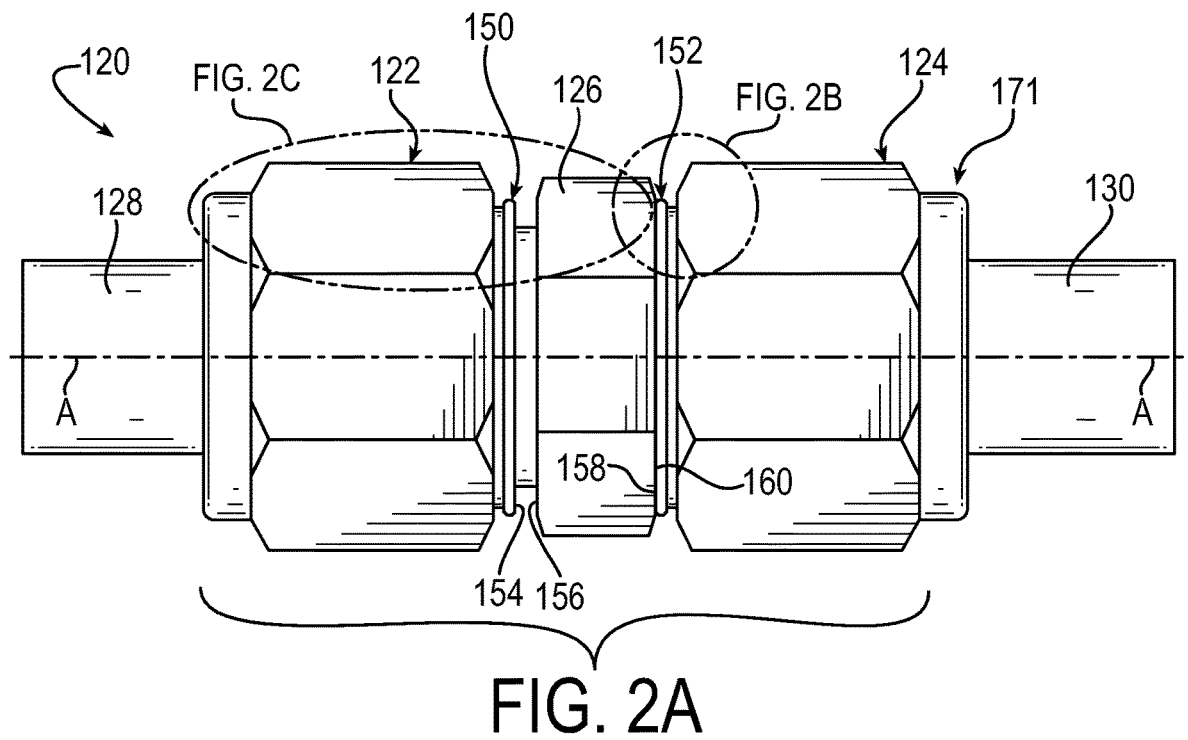
FIG. 2A is a front view of an exemplary union compression fitting including a left torque nut and a right torque nut, each torque nut having an exemplary axially deformable projection.

Referring now to the drawings and initially to FIG. 2A, an exemplary tube fitting assembly according to the invention (hereinafter referred to as a "union compression fitting") is designated generally by reference numeral 120. The union compression fitting 120 can be provided, for example, as part of a hydraulic system (not shown) for sub-sea applications, such as sub-sea oil wells.

The union compression fitting 120 may include a left torque nut 122 and a right torque nut 124 attached to a fitting body 126 to fluidly connect a left tube 128 with a right tube 130 to the fitting body. The left torque nut 122, the right torque nut 124, the fitting body 126, the left tube 128 and the right tube 130 may be coaxial with a central axis A. For example, the tubes 128, 130 and the fitting body 126 may form a continuous fluid passage along the central axis A.

Figure 9A:
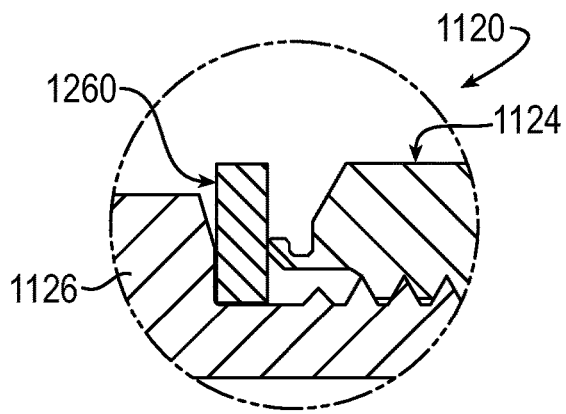
FIG. 9A is a front view of a partial cross-section of another exemplary union compression fitting with a fitting body having a stop collar assembly and being in a madeup position.

The left torque nut 122 and the right torque nut 124 may each include an axially deformable projection 150 and 152, respectively. The left torque nut 122 is illustrated in a finger tight position (i.e., the left torque nut 122 is finger tight). The finger tight position may be indicated by a space between an axially leading end 154 of the axially deformable projection 150 and an axially inwardly facing shoulder 156 of the fitting body 126. The axially inwardly facing shoulder 156 may face in a direction opposite the axially leading end 154 to directly engage the axially leading end 154 when the left torque nut 122 is madeup. The fitting body may have a stop collar as shown in FIG. 9A, and the stop collar may form the axially inwardly facing shoulder of the fitting body in such embodiment, as described below.

The right torque nut 124 may be identical to the left torque nut 122, but may be oriented in a position reversed compared to the left torque nut 122 to allow an axially leading end 158 of the axially deformable projection 152 to engage an axially inwardly facing shoulder 160 of the fitting body 126. The axially inwardly facing shoulder 160 may face in a direction opposite the axially inwardly facing shoulder 156, along the central axis A, to allow the tubes 128, 130 to be fluidly connected with a straight connection.

In an embodiment, the axially inwardly facing shoulders of the fitting body are not parallel to allow a non-parallel connection between the tubes, for example the axially inwardly facing shoulders may be angularly offset by 90 degrees or any other suitable angle to allow the tubes to be non-parallel to one another.

The right torque nut 124 is illustrated in a madeup position. Once the right torque nut 124 is finger tight (a position shown by the left nut 122), the madeup position may be reached by continuing to tighten the right torque nut 124 until the axially leading end 158 engages the axially inwardly facing shoulder 160. The torque required to tighten the right torque nut 124 may rise abruptly after the axially leading end 158 engages the axially inwardly facing shoulder 160, which may indicate that the right torque nut 124 is madeup. As the axially leading end 158 axially moves into engagement with the axially inwardly facing shoulder 160 a torque needed to additionally tighten the torque nut 124 may abruptly increase after only partial axial deformation of the axially deformable projection 152 relative to the axially inner end face of the torque nut.

The abrupt increase in torque needed to tighten the right torque nut 124 may indicate that the torque nut 124 has been tightened sufficiently to make or remake the torque nut 124. For example, the corresponding ferrule assembly (not shown) may be fully madeup to seal against the tube 130 and the fitting body 126. A user tightening the torque nut 124 may feel the abrupt rise in torque needed to tighten the torque nut 124, which allows the user to detect that the torque nut 124 is fully made without pre-marking the torque nut 124, use of a special tool—such as a torque wrench, or otherwise measuring torque nut 124 relative to the fitting body 126. Thus, the right torque nut 124 can be made or remade by a user purely by feel without undermaking or overmaking the right torque nut 124.

Alternatively, the rise in torque may indicate that only an additional slight rotation of the right torque nut 124 is required for makeup or remake.

The axially deformable projections 150, 152 may be made of a material that allows a user to feel the axially deformable projections 150, 152 resisting deformation. For example, the axially deformable projections 150, 152 may be made of a material with a yield strength of 60 kilopounds per square inch (KSI) or greater. In an embodiment, axially deformable projections are made of a material with a yield strength of 80 KSI or greater. In another embodiment, each torque nut is made of a material with a yield strength of at least 20 KSI, of at least 60 KSI, or at least 80 KSI.

Figure 2B:
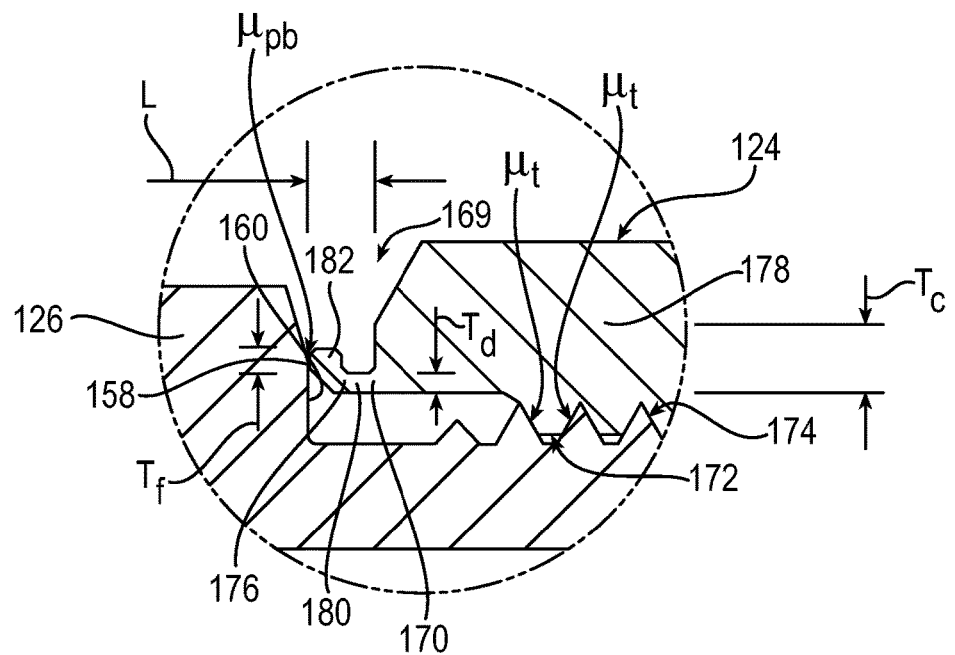
FIG. 2B is a front view of a partial cross-section of the union compression fitting of FIG. 2A with a fitting body and the axially deformable projection of the right torque nut in a madeup position.

FIG. 2B is a front view of a partial cross-section of the fitting body 126 engaged with the axially leading end 158 of the right torque nut 124. The entire right torque nut 124 may be one-piece. For example, the axially deformable projection 152 may be one-piece with an axially inner end face 169 of the right torque nut 124 and an axially outer end face 171 (shown in FIG. 2A) of the right torque nut 124.

The axially deformable projection 152 may be annularly continuous for forming a seal between the torque nut 124 and the fitting body 126 when the axially deformable projection 152 is engaged with the fitting body 126. For example, the axially deformable projection 152 may be non-permeable to fluid to allow the axially deformable projection 152 to seal against the axially inwardly facing shoulder 160. Sealing against the axially inwardly facing shoulder 160 may prevent fluid from flowing radially inwardly between the axially inwardly facing shoulder 160 and the axially inner end face 169.

The axially inner end face 169 may circumscribe a tube passage way—extending from the axially outer end face 171 to the axially inner end face 169—for receiving the tube 130. An axially inner annular opening of the axially inner end face 169 may receive the fitting body 126 axially opposite the axially outer end face 171.

The right torque nut 124 may have a base 170 extending in a first axial direction from the axially inner end 169 of the right torque nut 124. The base 170 may extend to the axially leading end 158 an axial length L. The base 170 may be entirely radially offset from the axially inner threaded end portion 172 to allow the right torque nut 124 to be assembled with the fitting body 126 and removed from the fitting body 126 without interference between the base 170 and axially inner threaded end portion 174 of the fitting body 126.

In an embodiment, the base or another portion of the axially deformable projection may not be offset from the corresponding axially inner threaded end portion of the fitting body after a portion of the axially deformable projection plastically deforms. The lack of radial offset with the axially inner threaded end portion may prevent the right torque nut from being completely removed from the fitting body.

The axially deformable projection 152 may include a deformable portion 176 disposed radially offset from the axially inner threaded end portion 172. The deformable portion 176 may be axially offset from the axially leading end 158. The axial offset allows a central body 178 of the right torque nut 124 to move axially toward the axially inwardly facing shoulder 160 while the axially leading end 158 axially abuts the axially inwardly facing shoulder 160. Thus, the axial length L may decrease as the right torque nut 124 is progressively tightened, such as when the right torque nut 124 is remade over and over again.

The deformable portion 176 may configured to deform before any other portion of the axially deformable projection 152 when axially engaging the axially inwardly facing shoulder 160. For example, the deformable portion 176 may be formed by a thin axially extending annular wall 180 that extends from the base 170 to a radially outwardly extending flange 182 that forms the axially leading end 158. The axially leading end 158 may have a radial thickness $T_F$ that is greater than a thickness $T_d$ of the deformable portion 176. For example, the radial thickness $T_F$ may be between 0% and 150% of the thickness $T_d$. In an embodiment, the radial thickness $T_F$ is between 50% and 100% of the thickness $T_d$. Thus, the deformable portion 176 may be more easily deformed than adjacent portions of the right torque nut 124 when the axially leading end 158 abuts the axially inwardly facing shoulder 160 and the right torque nut 124 is tightened.

As the right torque nut 124 tightens on the fitting body 126 the deformable portion 176 may plastically deform before any other portion of the right torque nut 124 upon an axial force from the axially inwardly facing shoulder 160 being applied to the axially leading end 158. For example, the thin axially extending annular wall 180 may allow a concentration of strain at the deformable portion 176 that is greater than each axially adjacent portion of the axially deformable projection 152.

The strain concentration at the deformable portion 176 may allow the axially leading end 158 to plastically deform relative to the base 170 as the right torque nut 124 is made or remade against the axially inwardly facing shoulder 160. In an alternative embodiment, axially deformable projection may be shaped such that the deformable portion is located closer to the base, at the base and/or closer to the axially leading end. For example, the deformable portion may be configured to be axially spaced from the base an axial distance from 30%-80% of L. In an embodiment, the deformable portion is configured to be axially spaced from the base an axial distance from 40%-60% of L. In another embodiment, the base may form the deformable portion.

The thickness $T_d$ may be configured based on a desired amount of remakes of the right torque nut 124. The thickness $T_d$ may be between 5% and 50% of a radial thickness $T_C$ of an axially central portion, such as the central body 178, of the right torque nut 124. In an embodiment, the deformable portion has a thickness of between 5% and 20% the radial thickness of an axially central portion. In an embodiment, the axially deformable projection has a thickness $T_d$ that is 10-50% an axial length L of the deformable projection.

The axial length L may be configured based on the desired amount of remakes of the torque nut 124. The axial length L may be between 100% and 400% of the thickness $T_d$. In an embodiment, the axial length L is between the thickness $T_d$ and 200% of the thickness $T_d$. For example, the axial length L may be equal to or approximately equal to the thickness $T_d$. In another embodiment, the axial length L is between the thickness $T_d$ and 100% of the radial thickness $T_C$.

As the right torque nut 124 advances toward the axially inwardly facing shoulder 160 the axially deformable projection 152 deforms. The axially deformable projection 152 may resist deformation upon an axial compressive force being applied to the axially leading end 158, which may cause an abrupt rise in torque required to continue advancing the right torque nut 124. The axially deformable projection 152 may deform first at the deformable portion 176 due to stress concentrating at the deformable portion 176. The deformation may be entirely or almost entirely plastic deformation as the deformable portion is compressed by the axially inwardly facing shoulder 160 abutting the axially leading end 158.

The axially leading end 158 may compress axially toward the central body 178. The axially leading end 158 may also flare slightly radially outward as the right torque nut advances toward the axially inwardly facing shoulder 160 when the deformable portion first deforms. For example, an outer circumference formed by a radially outermost surface of the axially leading end 158 may be expanded radially outward. As the axially leading end 158 flares radially outward into a new position the axially leading end 158 is radially outward of the deformable portion 176. As the right torque nut 124 continues to advance, the axially leading end 158 may continue to flare radially further away from the deformable portion 176. In an embodiment, the axially leading end is configured to curl axially toward the central body as the right torque nut continues to advance against the second axially extending surface.

Figure 2C:
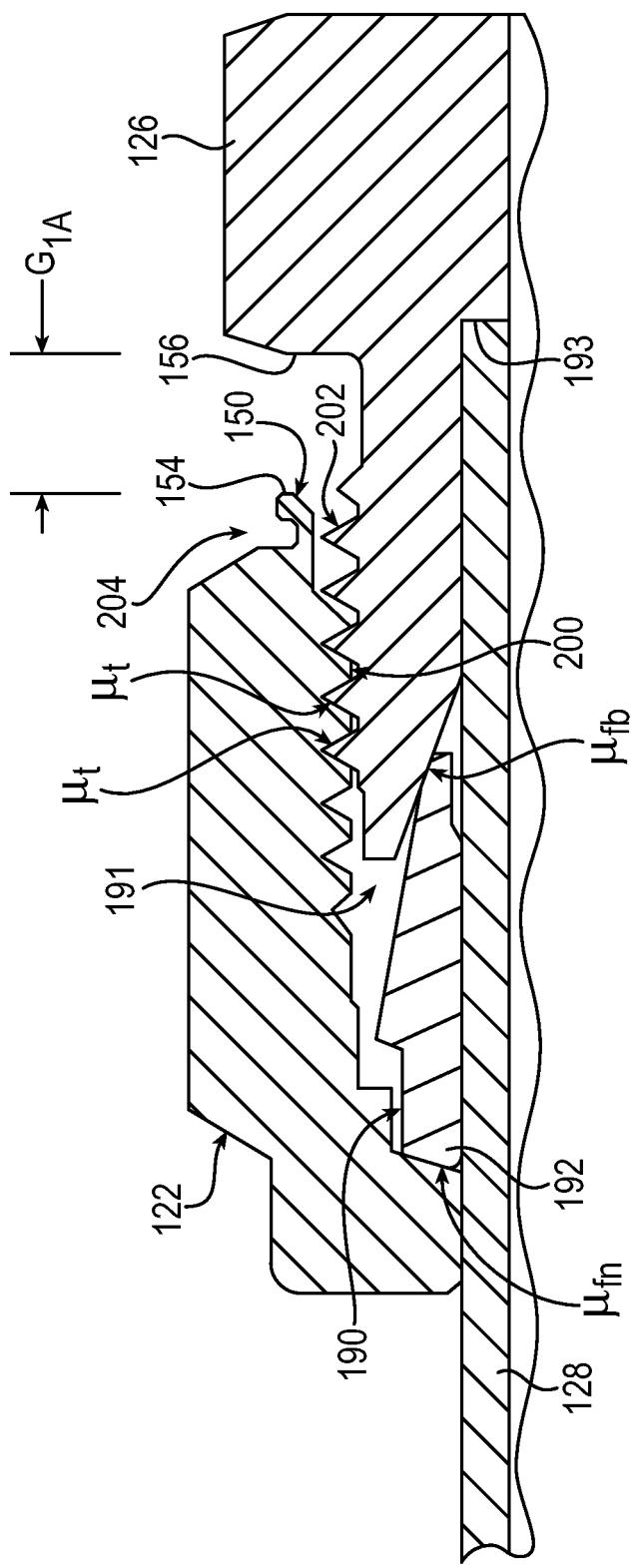
FIG. 2C is a front view of a partial cross-section of the union compression fitting of FIG. 2A with the left torque nut connected to the fitting body prior to makeup.

Referring now to FIG. 2C, the foregoing description of the right torque nut 124 and the corresponding right side of the fitting body 126 is equally applicable to the left torque nut 122 and the corresponding left side of the fitting body 126, except as noted below. The left torque nut 122 is illustrated in the finger tight position during a first makeup of the left torque nut 122 in combination with a ferrule assembly 190 and the fitting body 126. From the finger tight position an additional 1¼ tightening turns of the left torque nut 122 may makeup the torque nut 122. For example, a wrench may be used to tighten the left torque nut 122 by 1¼ additional turns (e.g., tightening by 7.5 flats of a hex-type right torque nut 124). Similarly, the right torque nut 124 may engage another ferrule assembly (not shown) that is an identical to the ferrule assembly 190 or a different type of ferrule assembly, such as a dual ferrule type ferrule assembly, to seal against an outer surface of the tube 130 (FIG. 2B).

Referring still to FIG. 2C, the ferrule assembly 190 may seal against an outer surface of the tube 128 to prevent fluid from leaking out of the tube 128 between the ferrule assembly 190 and the fitting body 126 and between the ferrule assembly 190 and the outer surface of the tube 128. For example, the ferrule assembly 190 may include a single ferrule to seal against an axially facing sloped engaging surface at an axially inner end face 191 of the fitting body 126 and to seal radially inwardly against the outer surface of the tube 128. As the left torque nut 122 is advanced toward the axially inwardly facing shoulder 156, the left torque nut 122 may engage the ferrule assembly 190 to compress the ferrule assembly into the axially facing sloped engaging surface of the fitting body 126 and thereby compress the ferrule assembly 190 into the outer surface of the tube 128.

The fitting body 126 may have a cavity opening to the axially inner end face 191 of the fitting body 126 for receiving an end of the tube 128. The fitting body 126 may also have an axially inwardly facing shoulder 193 radially offset from an axially inner threaded end portion 202. For example, the axially inwardly facing shoulder 193 may be radially inward of the axially inner threaded end portion 202 to receive the tube 128.

The fitting body 126 may have a radially inward facing axially inner surface 194 for engaging an inner end of the ferrule assembly 190 for radially inwardly compressing the ferrule assembly 190 around to tube 128 to form a seal with the tube 128. The ferrule assembly 190 may seal when the fitting body 126 and the ferrule assembly 190 are urged toward one another. For example, the left torque nut 122 may urge the ferrule assembly 190 against the fitting body 126 and the fitting body 126 may urge the ferrule assembly 190 radially inwardly to seal against the tube 128.

The fitting body 126 may be symmetrical, such that the fitting body has an identical geometry for engaging the tube 130, the torque nut 124, and the ferrule assembly (not shown) engaged by the torque nut 124 (FIG. 2B).

The ferrule assembly 190 may have a shape, size and orientation such that when the left torque nut 122 is finger tight, the ferrule assembly 190 is abutting the torque nut 122 and the fitting body 126. Also, upon a first makeup of the left torque nut 122 the ferrule assembly 190 is fully engaged with the fitting body 126 and the tube 128—to seal against both—as the axially leading end 154 abuts the axially inwardly facing shoulder 156. For example, and axial gap GM between the axially leading end 154 and the axially inwardly facing shoulder 156 may be the same axial distance required for the left torque nut 122 to slide a nut end 192 of the ferrule assembly 190 to seal the ferrule assembly against the fitting body 126 and the tube 128. The gap GM may be anywhere between 0.038"-0.075". In an embodiment the gap GM is 0.062". In another embodiment, the gap GM may be up to 0.125". In another embodiment, the gap GM may be greater than 0.125".

In another embodiment, the ferrule assembly is any suitable sealing mechanism, such as a single or dual ferrule system shown in International Application No. PCT/US2014/043230, filed Jun. 19, 2014 and entitled HIGH STRENGTH FLEXIBLE FERRULE, which is incorporated herein by reference.

The left torque nut 122, may be identical to the right torque nut 124 (FIG. 2B), and may include an axially inner threaded end portion 200 that may helically circumscribe the central axis A to engage an axially inner threaded end portion 202 of the fitting body 126. The axially inner threaded end portion 202 may circumscribe the central axis A and face radially outwardly to engage the radially inwardly facing axially inner threaded end portion 200. In an embodiment, the left torque nut may have a radially outwardly facing axially inner threaded end portion to engage a radially inwardly facing axially inner threaded end portion of the fitting body.

During assembly, the left torque nut 122 may be slid onto the tube 128 and the ferrule assembly 190 may be slid onto the tube 128 to a position within the left torque nut 122. An axially inner end of the tube 128 may engage the radially inner axially inwardly facing shoulder of the fitting body 126, and an annular portion of the fitting body 126 that includes the axially inner threaded end portion 202 may be received by an axially inner end face 204 of the left torque nut 122. For example, the axially inner end face 204 may define a central cavity that receives the annular portion of the fitting body 126 to allow the fitting body 126 to engage the ferrule assembly 190.

The entire axially deformable projection 150 may be disposed radially outward of the axially inner threaded end portion 202 and/or the axially inner threaded end portion 200 to allow the axially deformable projection 150 to move axially relative to the axially inner threaded end portion 202 prior to the first makeup. The axially deformable projection 150 and the axially inwardly facing shoulder 156 may be configured to allow the axially deformable projection 150 to deform and remain radially offset from the axially inner threaded end portion 202 and/or the axially inner threaded end portion 200. Thus, after subsequent remakes, the left torque nut 122 may be removable from the fitting body 126 along with the axially deformable projection 150.

During remake the union compression fitting 120 can be remade by removing the left torque nut 122 so that the tube 128 can be separated from the fitting body 126. The left torque nut 122 and the ferrule assembly may then be reassembled with the tube 128 and the fitting body 126 and at first finger tightened. Next, the left torque nut 122 may be tightened against the ferrule assembly 190 until the axially leading end 154 engages the axially inwardly facing shoulder 156 of the fitting body 126 which causes an abrupt increase in the torque required to turn the nut further. Each subsequent remake may cause some further deformation of the axially deformable projection 150 and the ferrule assembly 190. The deformation of the axially deformable projection 150 may match the deformation of the ferrule assembly 190.

For example, axially inwardly facing shoulder 156 may be perpendicular to the central axis A and parallel to the axially leading end 154 of the axially deformable projection 150. Thus, the axially leading end 154 may compress axially toward the central body 178. The axially leading end 158 may also flare slightly radially outwardly during makeup and/or subsequent remakes of the left torque nut 122, which prevents the axially deformable projection 150 from interfering with the axially inner threaded end portion 202 when removing the left torque nut 122. In an embodiment, the axially inwardly facing shoulder is sloped radially outward to deform the axially deformable projection radially outward further away from the axially inner threaded end portion of the fitting body during makeup or subsequent remakes. In another embodiment, the axially inwardly facing shoulder is sloped to face radially inward to deform the axially deformable projection radially inward during makeup or subsequent remakes.

Figure 3:
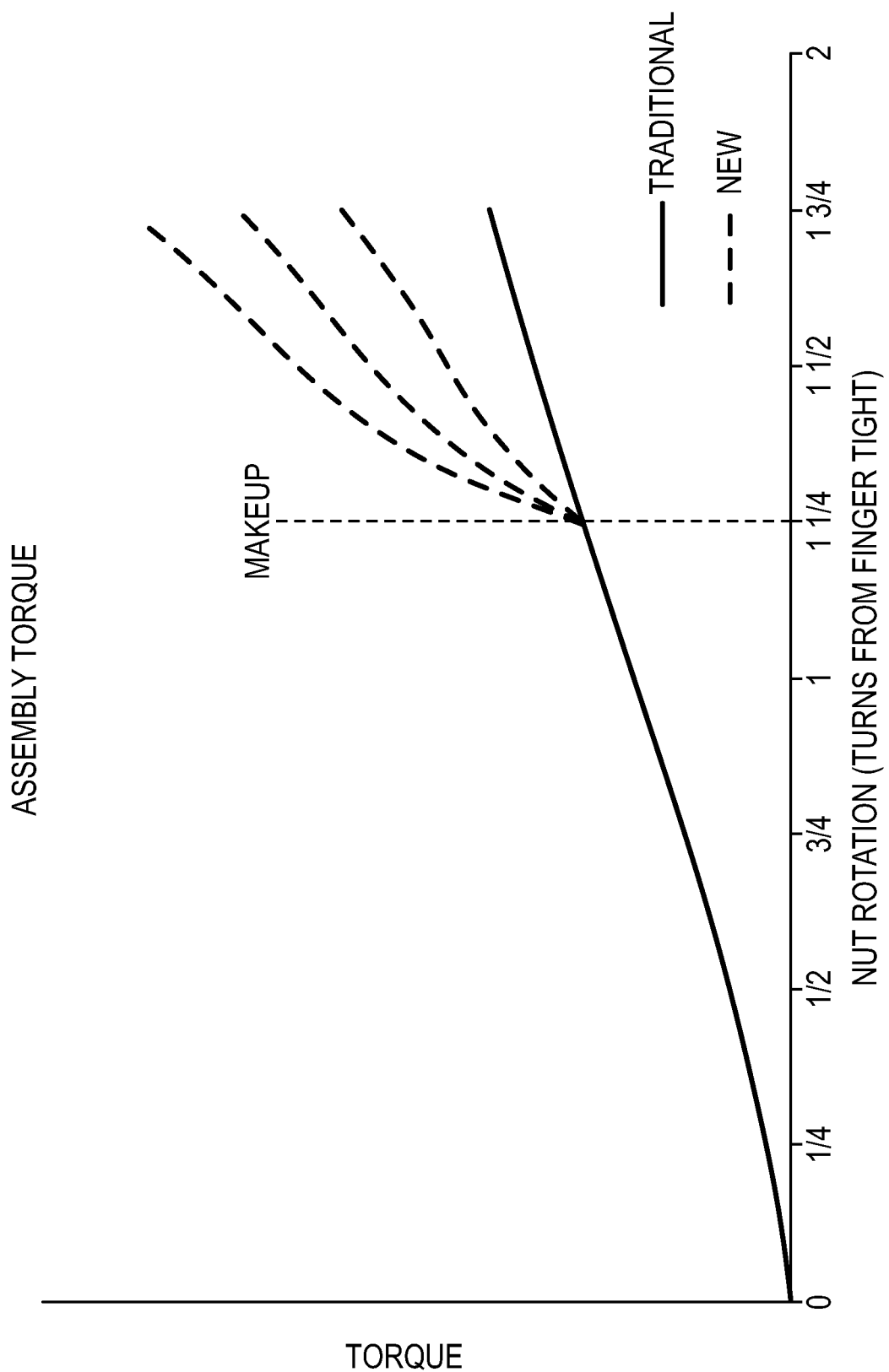
FIG. 3 is an exemplary assembly torque vs. torque nut rotation diagram of torque curves for variations of the torque nuts of FIG. 2A in dashed lines compared to torque values for traditional nuts shown in FIG. 1A.

Referring now to FIG. 3, an exemplary torque vs. nut rotation diagram is illustrated to compare a relative torque curve required to makeup a traditional nut and relative torque curves required to makeup exemplary torque nuts of the present disclosure. The torque curves during makeup of a traditional nut is illustrated with a continuous solid line having an approximately constant rate of torque increase as the traditional nut advances from a finger tight position.

Makeup occurs when the ferrule assembly 190 is sealed to the tube 128, which is indicated by a vertical dashed line intersecting each relative torque curve at about 1¼ turns from finger tight. To reach makeup, the axially leading end 154 (FIG. 2C) of the axially deformable projection 150 axially moves into engagement with the axially inwardly facing shoulder 156 of the fitting body 126 to cause an abrupt increase in torque needed to tighten the left torque nut 122 on the fitting body 126 after only partial axial deformation of the axially deformable projection 150 relative to the axially inner end face 204 of the torque nut 122. Referring again to FIG. 3, the abrupt increase in torque needed to tighten the nut indicates that the left torque nut 122 (FIG. 2C) has been tightened sufficiently on the fitting body 126 to seal the ferrule assembly 190 to the tube 128.

Torque values for the exemplary torque nuts are represented with dashed lines and may have the same torque values as the traditional nuts until the exemplary nut abuts a corresponding body. Once the exemplary nut abuts the body the torque required to advance the nut may rise abruptly, thus forming a slope discontinuity in the illustrated graph of torque values. For example, the torque nuts 122, 124 (FIGS. 2A-2C) may have an axially leading end 154, 158 that abuts a corresponding axially inwardly facing shoulder 156, 160 at or at about 1.25 turns from the finger tight position (e.g., FIG. 2C). The rate of torque increase may increase by anywhere between 40% and 100% once the axially leading end 154, 158 abuts the axially inwardly facing shoulder 156, 160. In an embodiment, the rate of torque increase may increase by 75% or more. In another embodiment, the rate of torque increase may increase by 100% or more.

A user tightening the torque nut 122, 124 is able to feel the abrupt rise in torque required to advance the nut further at an advanced position and thus stop advancing the torque nut 122, 124 to avoid overmaking the torque nut 122, 124. In an embodiment, the torque nut may be rotated ¼-½ a hex flat from the advanced position to ensure the nut is madeup to prevent leakage. In an embodiment, the torque nut may be rotated 1 hex flat. In another embodiment, the torque nut may be rotated less than ¼ of a hex flat.

Figure 4:
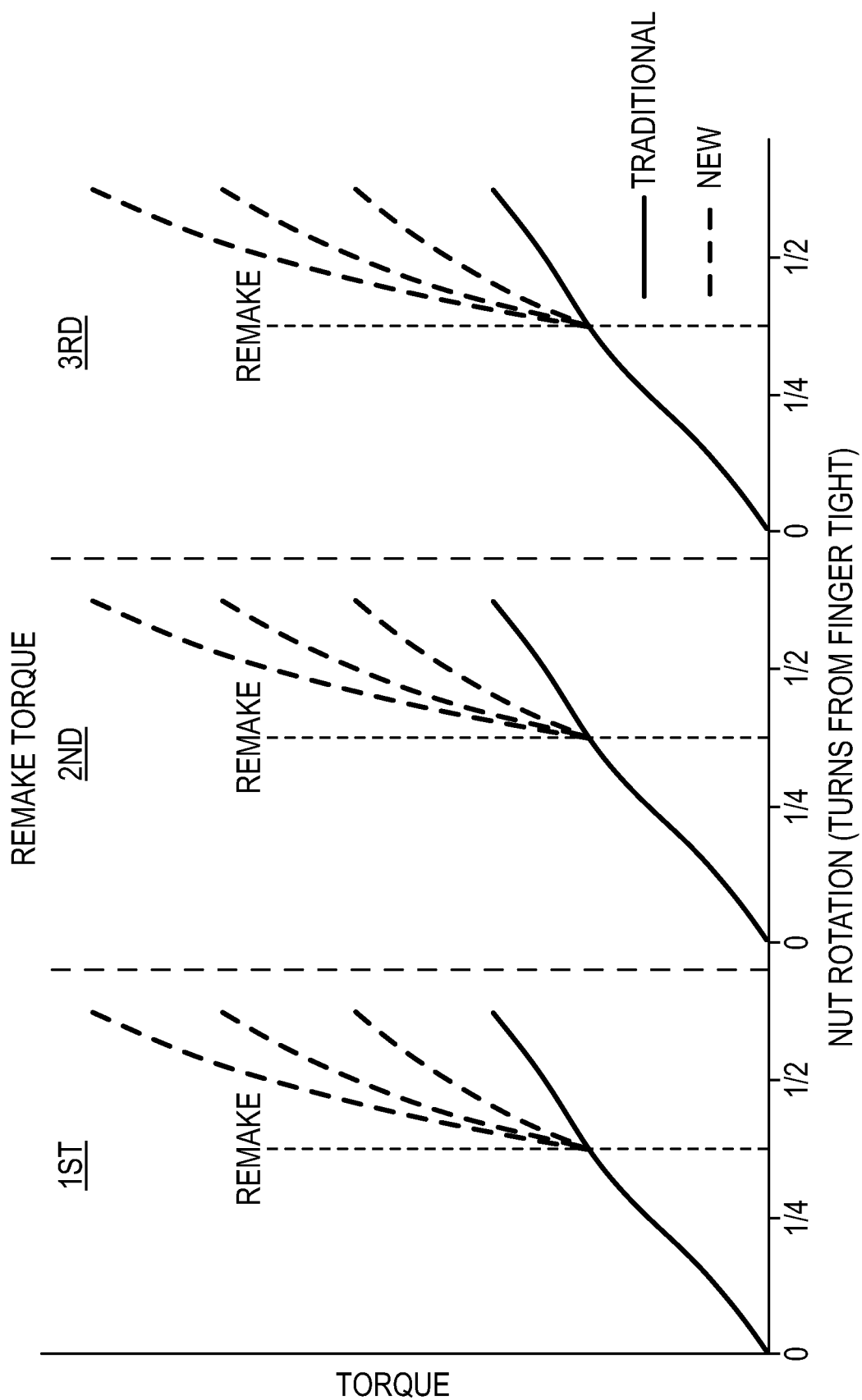
FIG. 4 is an exemplary remake torque vs. torque nut rotation diagram of torque curves during multiple remakes for variations of the torque nuts of FIG. 2A in dashed lines compared to torque curves for traditional nuts shown in FIG. 1A.

Referring now to FIG. 4, an exemplary torque vs. nut rotation diagram is illustrated to compare a relative torque curve required to remake a traditional nut and relative torque curves required to remake exemplary torque nuts of the present disclosure. Torque curves are provided for a first remake, a second remake and a third remake. The torque curves for each remake are separated by a vertical dashed line and each subsequent finger fight position is represented by each "0" nut rotation position.

Remake occurs when the ferrule assembly 190 is re-sealed to the tube 128. Remake is indicated by multiple vertical dashed lines, each intersecting corresponding relative torque curves at about ⅜ of a turn from finger tight. To be remade, the axially leading end 154 (FIG. 2C) of the axially deformable projection 150 axially moves into engagement with the axially inwardly facing shoulder 156 of the fitting body 126 to cause an abrupt increase in torque needed to tighten the left torque nut 122 on the fitting body 126 after only partial axial deformation of the axially deformable projection 150 relative to the axially inner end face 204 of the torque nut 122. The partial axial deformation may be less than the deformation during makeup. Referring again to FIG. 3, the abrupt increase in torque needed to tighten the nut indicates that the left torque nut 122 (FIG. 2C) has been tightened sufficiently on the fitting body 126 to seal the ferrule assembly 190 to the tube 128.

The torque curves of the traditional nut are illustrated with a continuous solid line for a first remake, a second remake and a third remake. The torque curves during each remake of the traditional nut have an approximately constant rate of torque increase as the traditional nut advances from each subsequent finger tight position, in a similar fashion to the torque curves of the initial remake illustrated in FIG. 3. The shape of each torque curve depends upon the configuration of the corresponding axially deformable projection and axially inwardly facing shoulder (illustrated by way of example in FIG. 2C as reference numerals 150 and 156, respectively). For example, the nuts 122, 124 (FIG. 2A) may correspond to the intermediate dashed lines for each subsequent remake.

The abrupt rise in torque required to continue tightening the corresponding nut for each subsequent remake allows a user to properly make the torque nuts 122, 124—based on feeling the abrupt rise—without overmaking the torque nuts 122, 124. The user may also avoid taking the time to pre-mark the torque nuts 122, 124 and corresponding fitting body 126 (FIG. 2A).

Figure 5A:
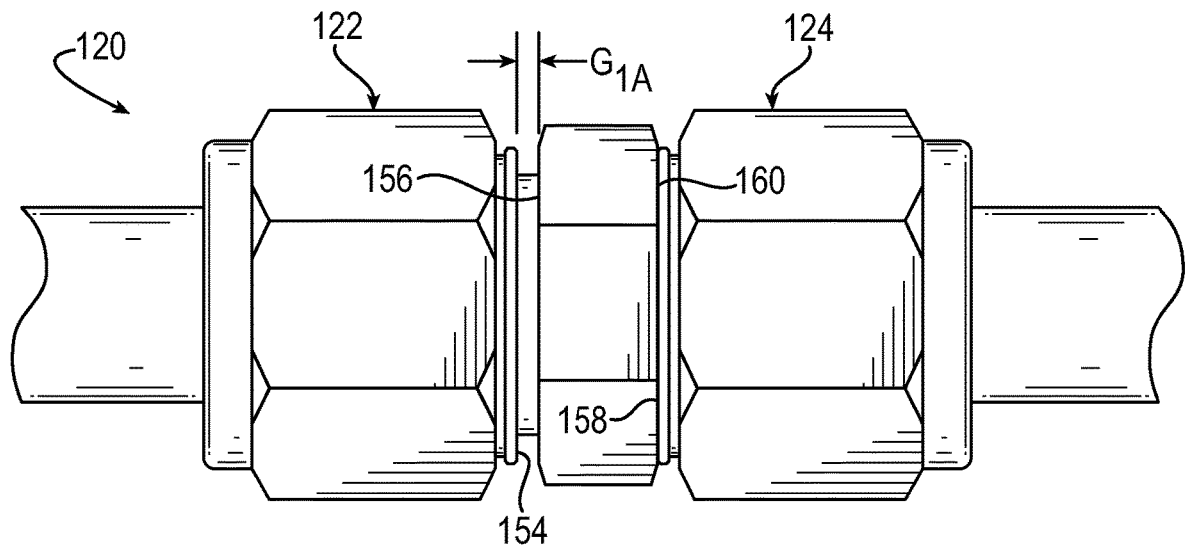
FIG. 5A is a front view of the union compression fitting of FIG. 2A with a properly assembled finger tight left torque nut and a properly assembled madeup right torque nut.

Referring now to FIG. 5A, the union compression fitting 120 is illustrated in a partially assembled position. The right torque nut 124 is made up, as indicated by the axially leading end 158 abutting the axially inwardly facing shoulder 160. The left torque nut 122 is finger tight, as indicated by the gap $G_{1A}$ between the axially leading end 154 and the axially inwardly facing shoulder 156. For example, the gap $G_{1A}$ may have an axial length be between 0.038" and 0.075" to visually indicate that the left torque nut 122 is properly assembled prior to final assembly.

Figure 5B:
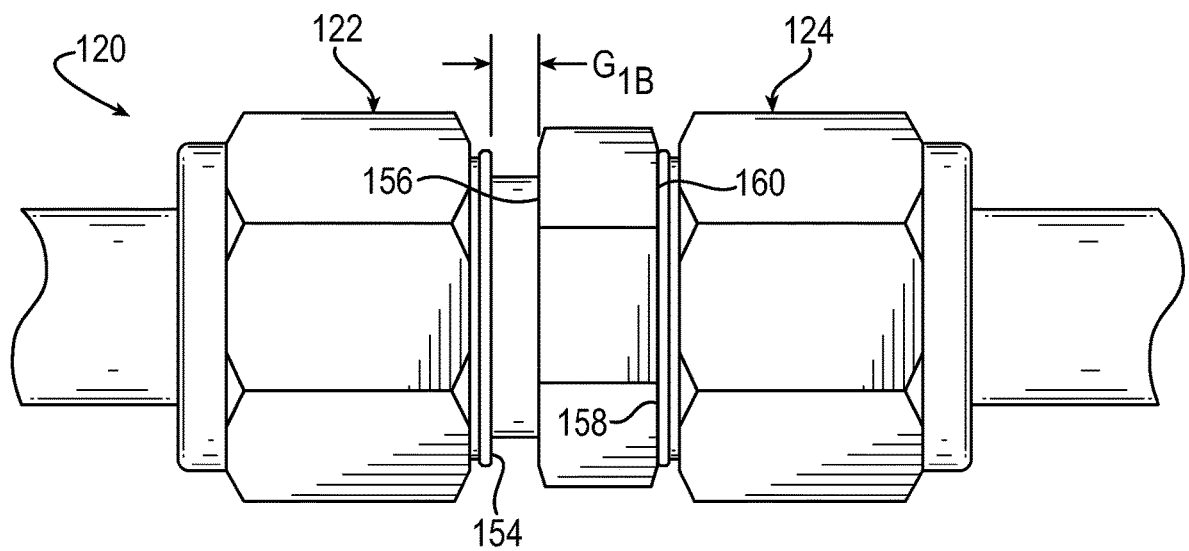
FIG. 5B is a front view of a single ferrule union compression fitting with improperly assembled ferrule assemblies engaged with torque nuts.

FIG. 5B illustrates the union compression fitting 120, but with improperly assembled torque nuts 122, 124. The left torque nut 122 is illustrated in a finger tight position with the ferrule assembly 190 (FIG. 2C) inserted backwards. The left torque nut 122 is finger tight, but improperly assembled, as indicated by a gap $G_{1B}$ between the axially leading end 154 and the axially inwardly facing shoulder 156. For example, the gap $G_{1B}$ may have an axial length more than twice the axial length of the gap $G_{1A}$, to indicate the ferrule assembly 190 is not properly assembled prior to final assembly.

The right torque nut 124 is illustrated in a finger tight position with the corresponding ferrule assembly (not shown) not inserted. The right torque nut 124 is finger tight, but improperly assembled, as indicated by the lack of a gap between the axially leading end 158 and the axially inwardly facing shoulder 160. Thus, a visual inspection of the right torque nut 124 at the finger tight position may indicate that the corresponding ferrule assembly is not properly assembled prior to final assembly.

Figure 5C:
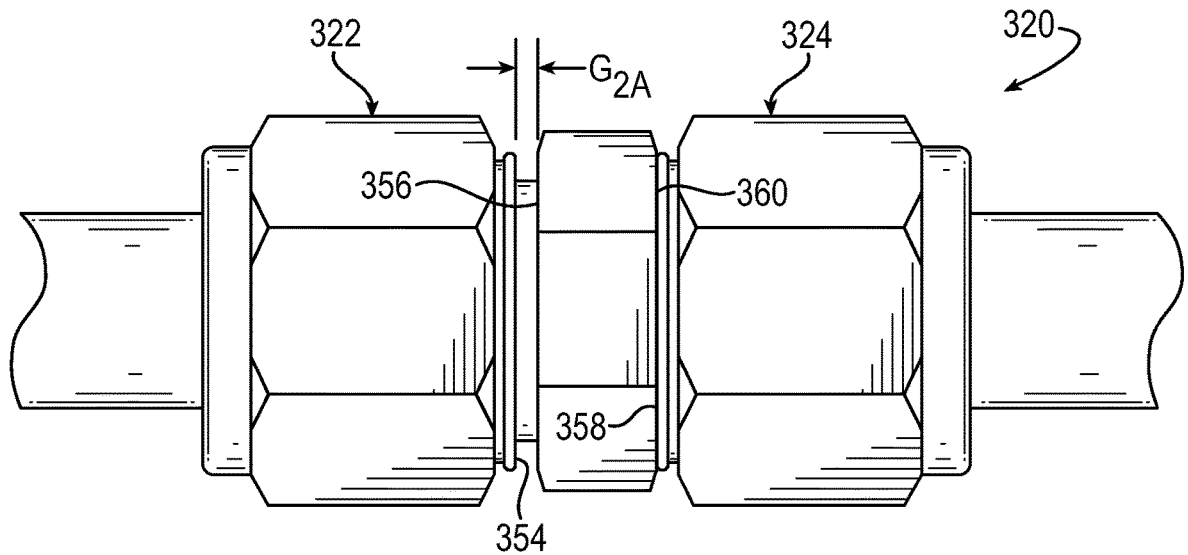
FIG. 5C is a front view of another exemplary union compression fitting having a dual ferrule assembly, a properly assembled ferrule assembly engaged with finger tight left torque nut and a properly assembled ferrule assembly engaged with madeup right torque nut.
Figure 5D:
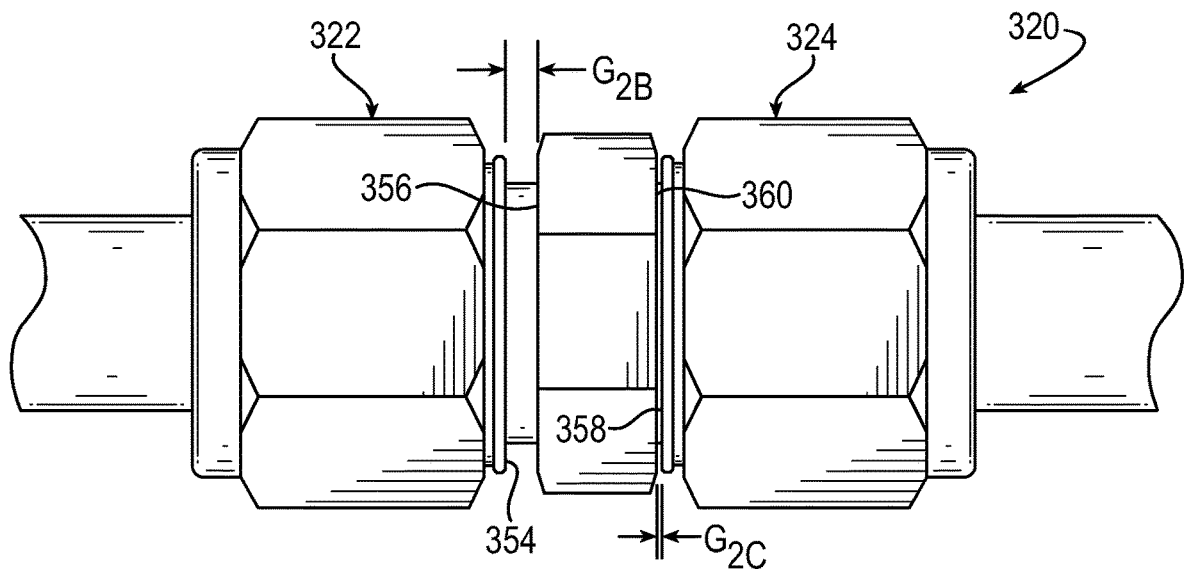
FIG. 5D is a front view of another exemplary union compression fitting having a dual ferrule assembly and improperly assembled back ferrules engaged with finger tight torque nuts.
Figure 5E:
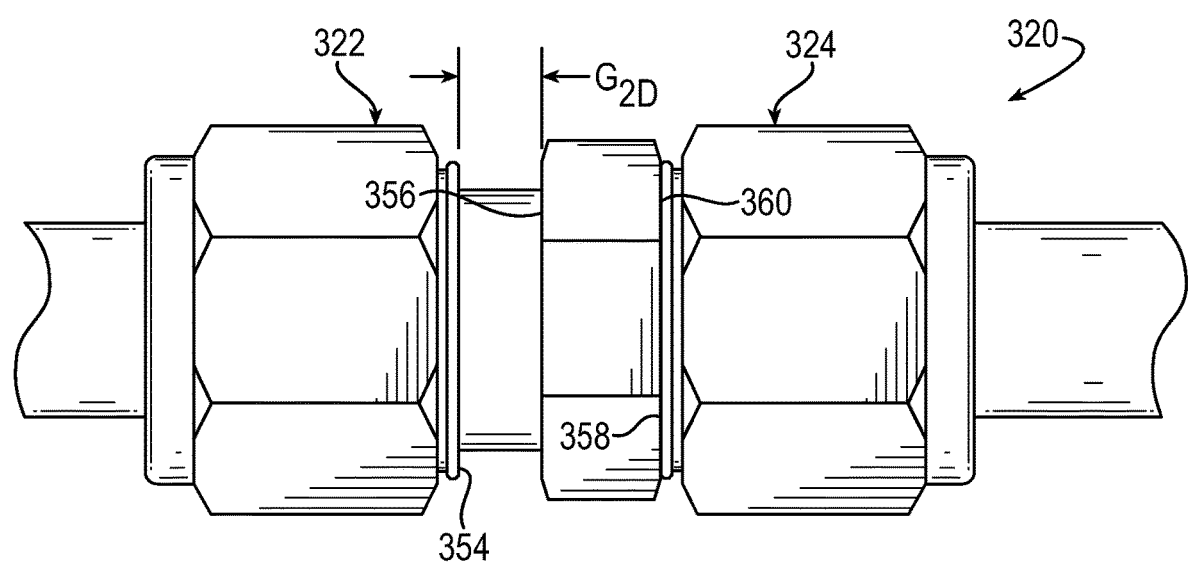
FIG. 5E is a front view of another exemplary union compression fitting having a dual ferrule assembly and improperly assembled front ferrules engaged with finger tight torque nuts.

Turning now to FIG. 5C-5E, exemplary embodiments of the union compression fitting is shown at 320. The union compression fitting 320 is substantially the same as the above-referenced union compression fitting 120, and consequently the same reference numerals but indexed by 200 are used to denote structures corresponding to similar structures in the union compression fittings. In addition, the foregoing description of the union compression fitting is equally applicable to the union compression fitting 320 except as noted below. Moreover, it will be appreciated that aspects of the union compression fittings may be substituted for one another or used in conjunction with one another where applicable.

The union compression fitting 320 includes a dual ferrule type ferrule assembly (not shown) for each of a left torque nut 322 and a right torque nut 324. The ferrule assembly includes a back ferrule (not shown) and a front ferrule (not shown).

Referring briefly to FIG. 5C, the union compression fitting 320 is illustrated in a partially assembled position. The right torque nut 324 is made up, as indicated by an axially leading end 358 abutting an axially inwardly facing shoulder 360. The left torque nut 322 is finger tight, as indicated by a gap $G_{2A}$ between an axially leading end 354 and an axially inwardly facing shoulder 356. For example, the gap $G_{2A}$ may have an axial length be between 0.038"-0.075" to visually indicate that the corresponding ferrule assembly (e.g., ferrule assembly 190 in FIG. 2C) is properly assembled. In another embodiment, the gap $G_{2A}$ may be up to 0.125". In another embodiment, the gap $G_{2A}$ may be greater than 0.125".

FIG. 5D illustrates the union compression fitting 320, but with improperly assembled torque nuts 322, 324. The left torque nut 322 is illustrated in a finger tight position with the back ferrule (not shown) inserted backwards. The left torque nut 322 is finger tight, but improperly assembled, as indicated by a gap $G_{2B}$ between the axially leading end 354 and the axially inwardly facing shoulder 356. For example, the gap $G_{2B}$ may have an axial length of at least 50% greater than the axial length of the gap $G_{2A}$, to indicate the ferrule assembly is not properly assembled prior to final assembly.

The right torque nut 324 is illustrated in a finger tight position with the corresponding dual ferrule assembly (not shown) missing the back ferrule. The right torque nut 324 is finger tight, but improperly assembled, as indicated by the gap $G_{2C}$ between the axially leading end 358 and the axially inwardly facing shoulder 360. Thus, a visual inspection of the right torque nut 324 at the finger tight position may indicate that the corresponding ferrule assembly is not properly assembled with the right torque nut 324. For example, the gap $G_{2C}$ may have an axial length of 50% or less than the axial length of the gap $G_{2A}$, to indicate the ferrule assembly is not properly assembled prior to final assembly.

FIG. 5E illustrates the union compression fitting 320, but with improperly assembled nuts 322, 324. The left torque nut 322 is illustrated in a finger tight position with the front ferrule (not shown) inserted backwards. The left torque nut 322 is finger tight, but improperly assembled, as indicated by a gap $G_{2D}$ between the axially leading end 354 and the axially inwardly facing shoulder 356. For example, the gap $G_{2D}$ may have an axial length of at least 100% greater than the axial length of the gap $G_{2A}$, to indicate the ferrule assembly is not properly assembled prior to final assembly.

The right torque nut 324 is illustrated in a finger tight position with the corresponding dual ferrule assembly (not shown) missing the front ferrule. The right torque nut 324 is finger tight, but improperly assembled, as indicated by the lack of a gap between the axially leading end 358 and the axially inwardly facing shoulder 360. Thus, a visual inspection of the right torque nut 324 at the finger tight position may indicate that the corresponding ferrule assembly is not properly assembled prior to final assembly.

Turning now to FIGS. 6A-6E, exemplary embodiments of the union compression fitting are shown at 520. The union compression fittings 520 are substantially the same as the above-referenced compression fittings 120, 320, and consequently the same reference numerals but indexed by 200 are used to denote structures corresponding to similar structures in the union compression fittings. In addition, the foregoing descriptions of the union compression fittings 120, 320 are equally applicable to the union compression fittings 520 except as noted below. Moreover, it will be appreciated that aspects of the union compression fittings may be substituted for one another or used in conjunction with one another where applicable.

Figure 6A:
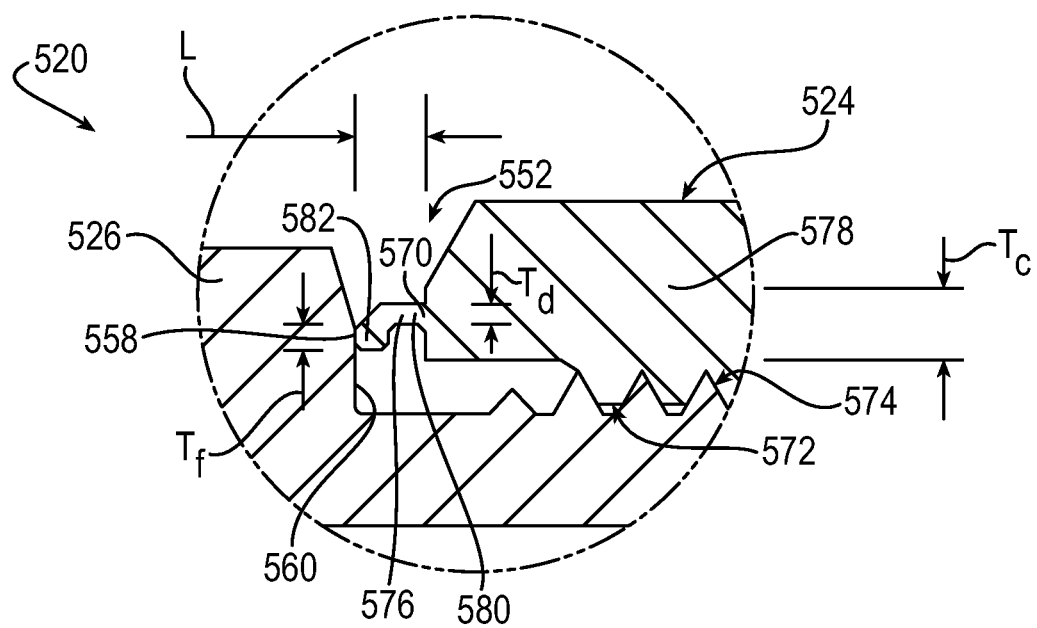
FIG. 6A is a front view of a partial cross-section of another exemplary union compression fitting in a madeup position.

FIG. 6A illustrates a union compression fitting 520 that includes a fitting body 526 with a right torque nut 524 attached to the fitting body 526. The right torque nut 524 may include an axially deformable projection 552 and the fitting body 526 may include an axially inwardly facing shoulder 560 for engaging an axially leading end 558 of the axially deformable projection 552.

The axially deformable projection 552 may include a deformable portion 576 disposed radially offset from axially inner threaded end portion 572. For example, the axially leading end 558 may be and/or may extend radially inward of the deformable portion 576 prior to any deformation. The deformable portion 576 may be axially offset from the axially leading end 558. The axial offset allows a central body 578 of the right torque nut 524 to move axially toward the axially inwardly facing shoulder 560 while the axially leading end 558 axially abuts the axially inwardly facing shoulder 560. Thus, an axial length L may decrease as the right torque nut 524 is progressively tightened, such as when the right torque nut 524 is remade over and over again.

The deformable portion 576 may be formed by a thin axially extending annular wall 580 that extends from a base 570 to a radially inwardly extending flange 582 that forms the axially leading end 558.

The base 570 may be radially offset a distance that allows the axially deformable projection 552 to fully deform radially inwardly without interfering with the axially inner threaded end portion 574 when the right torque nut 524 is removed from the fitting body 526. For example, the base 570 may be radially outwardly offset from the axially inner threaded end portion 574 a distance that is equal to or greater than a length of the axially deformable projection 552 from the base 570 to the axially leading end 558. Thus, when the axially deformable projection 552 is fully deformed, the axially leading end 558 may remain radially offset from the axially inner threaded end portion 574.

The axially leading end 558 may have a radial thickness $T_F$ that is greater than a thickness $T_d$ of the deformable portion 576. For example, the radial thickness $T_F$ may be between 0% and 150% of the thickness $T_d$. In an embodiment, the radial thickness $T_F$ is between 50% and 100% of the thickness $T_d$.

The axially leading end 558 may also be radially inwardly offset from the thin axially extending annular wall 580. Thus, the deformable portion 576 may be more easily deformed than adjacent portions of the right torque nut 524 when the axially leading end 558 abuts an axially inwardly facing shoulder 560 and the right torque nut 524 is tightened.

The strain concentration at the deformable portion 576 may allow the axially leading end 558 to plastically deform relative to the base 570 as the right torque nut 524 is made or remade against the axially inwardly facing shoulder 560.

The thickness $T_d$ may be between 5% and 50% of a radial thickness $T_C$ of an axially central portion, such as the central body 578, of the right torque nut 524. In an embodiment, the deformable portion has a thickness of between 5% and 20% the radial thickness of an axially central portion.

The axial length L may be configured based on the desired amount of remakes of the torque nut 124. The axial length L may be between 100% and 400% of the thickness $T_d$. In an embodiment, the axial length L is between the thickness $T_d$ and 200% of the thickness $T_d$. For example, the axial length L may be equal to or approximately equal to the thickness $T_d$. In an embodiment, the axial length L is between the thickness $T_d$ and 100% of the radial thickness $T_C$. In another embodiment, the axial length L is configured to prevent the axially leading end from deforming radially inward radially even with the axially inner threaded end portion of the fitting body and/or the axially inner threaded end portion of the torque nut.

As the right torque nut 524 advances toward the axially inwardly facing shoulder 560 the axially deformable projection 552 deforms. For example, the axially leading end 558 may be configured to constrict radially inwardly when the deformable portion 552 deforms as the right torque nut 524 is advanced after the axially leading end 558 abuts the axially inwardly facing shoulder 560. The axially deformable projection 552 may resist deformation upon an axial compressive force being applied to the axially leading end 558, which may cause an abrupt rise in torque required to continue advancing the right torque nut 524. The axially deformable projection 552 may deform first at the deformable portion 576 due to stress concentrating at the deformable portion 576. The deformation may be entirely or almost entirely plastic deformation as the deformable portion is compressed by the axially inwardly facing shoulder 560 abutting the axially leading end 558.

Figure 6B:
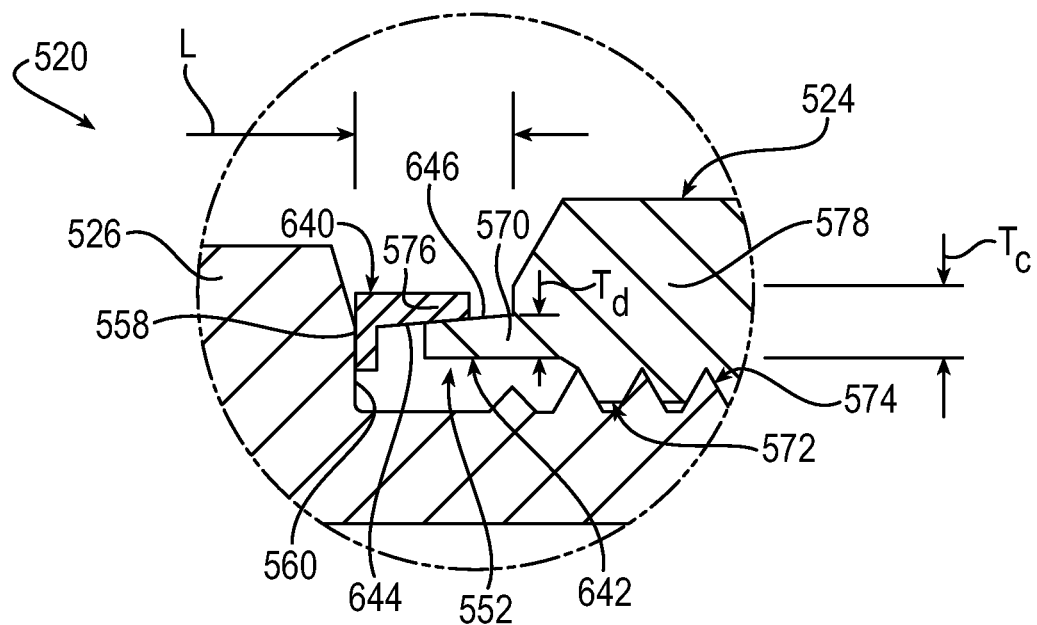
FIG. 6B is a front view of a partial cross-section of yet another exemplary union compression fitting in a madeup position.

FIG. 6B illustrates a union compression fitting 520 that includes a fitting body 526 with a right torque nut 524 attached to the fitting body 526. The right torque nut 524 may include an axially deformable projection 552 and the fitting body 526 may include an axially inwardly facing shoulder 560 for engaging an axially leading end 558 of the axially deformable projection 552. The axially deformable projection 552 may include separate components, such as an annular insert 640 and an annular wall 642.

The annular insert 640 may include a deformable portion 576 that is press-fit to the annular wall 642 such that the annular insert 640 remains integral with the annular wall 642 during makeup and remake. The annular insert 640 may also include an L-shape cross-section. The axially leading end 558 may be and/or may extend radially inward of the deformable portion 576 prior to any deformation.

The annular insert 640 may form a radially inward facing surface 644 for engaging a radially outward facing surface 646 of the annular wall 642. The radially inward facing surface 644 and the radially outward facing surface 646 may be non-parallel with one another. For example, the radially inward facing surface 644 may be axially sloped to face toward the annular wall 642. The angle of the axial slope may be between 1° and 10°. For example, the angle of the slope may be exactly or may be approximately 3° relative to the radially outward facing surface 646. The relative sloping allows the deformable portion 576 to expand radially outwardly as the annular wall 642 moves axially in toward the fitting body 526 relative to the deformable portion 576. Thus, as the right torque nut 524 advances toward the axially inwardly facing shoulder 560 the radially inward facing surface 644 and the deformable portion 576 may expand radially outward.

An axial length L may decrease as the right torque nut 524 is progressively tightened, such as when the right torque nut 524 is remade over and over again. As the axial length L decreases and the radially inward facing surface 644 deforms, the annular insert 640 may become press-fit to the radially outward facing surface 642. Thus, the annular insert 640 may be integral with the axially deformable projection 552, which is integral with the right torque nut 524.

A radially innermost portion of the annular insert 644 may be radially outward of an axially inner threaded end portion 574 and/or the axially inner threaded end portion 572 to allow the annular insert to be removable from the fitting body 526.

The strain concentration at the deformable portion 576 may allow an axially intermediate portion of the plastically deformable portion 576 to deform relative to the annular wall 642 as the right torque nut 524 is made or remade against the axially inwardly facing shoulder 560.

The thickness $T_d$ at a base 570 may be between 20% and 80% of a radial thickness $T_C$ of an axially central portion, such as the central body 578, of the right torque nut 524. In an embodiment, the deformable portion has a thickness of between 5% and 20% the radial thickness of an axially central portion.

The annular insert 640 may be formed of a material that has a yield strength less than the yield strength of the annular wall 642 to allow the annular insert 640 to deform before the annular wall 642. The annular insert 640 may be made of a powdered metal material, a plastic material and/or another suitable material. For example, the annular insert 640 may have a yield strength of between 20% and 100% of the yield strength of the annular wall 642. In an alternative embodiment, the annular insert 640 has a yield strength of 60 KSI or greater, or 80 KSI or greater.

The axial length L may be configured based on the desired amount of remakes of the torque nut 124. The axial length L may be between 100% and 400% of the thickness $T_d$. In an embodiment, the axial length L is between the thickness $T_d$ and 200% of the thickness $T_d$. For example, the axial length L may be equal to or approximately equal to the thickness $T_d$. In an embodiment, the axial length L is between the thickness $T_d$ and 100% of the radial thickness $T_C$. In another embodiment, the axial length L is configured to prevent the axially leading end from deforming radially inward radially even with the axially inner threaded end portion of the fitting body and/or the axially inner threaded end portion of the torque nut.

As the right torque nut 524 advances toward the axially inwardly facing shoulder 560 the axially deformable projection 552 deforms. For example, the radially inward facing surface 644 may deform as the right torque nut 524 is advanced after the axially leading end 558 abuts the axially inwardly facing shoulder 560. The radially inward facing surface 644 may resist deformation upon a radially outward force being applied to the radially inward facing surface 644 by the radially outward facing surface 646, which may cause an abrupt rise in torque required to continue advancing the right torque nut 524. The axially deformable projection 552 may deform first at the deformable portion 576 due to stress concentrating at the deformable portion 576 and/or due to the deformable portion 576 being made of a material with a yield strength less than the annular wall 642. The deformation may be entirely or almost entirely plastic deformation as the deformable portion 576 is expanded by the radially outward facing surface 646.

Figure 6C:
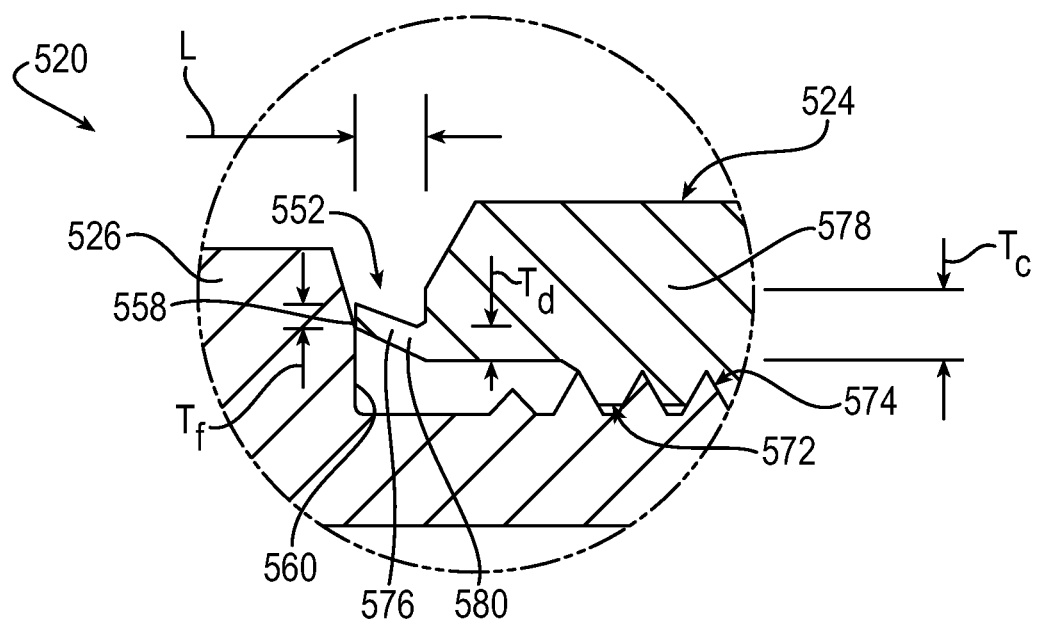
FIG. 6C is a front view of a partial cross-section of a further exemplary union compression fitting in a madeup position.

FIG. 6C illustrates a union compression fitting 520 that includes a fitting body 526 with a right torque nut 524 attached to the fitting body 526. The right torque nut 524 may include an axially deformable projection 552 and the fitting body 526 may include an axially inwardly facing shoulder 560 for engaging an axially leading end 558 of the axially deformable projection 552.

The axially deformable projection 552 may include a deformable portion 576 disposed radially offset from axially inner threaded end portion 572. For example, the axially leading end 558 may be and/or may extend radially outward of the deformable portion 576 prior to any deformation. The deformable portion 576 may be axially offset from the axially leading end 558.

The deformable portion 576 may be formed by a thin radially and axially extending annular wall 580 that extends from a base 570 to the axially leading end 558. The annular wall 580 may progressively thin from the base 570 to the axially leading end 558. For example, the axially leading end 558 may have a radial thickness $T_F$ that is less than a thickness $T_d$ of the deformable portion 576. For example, the radial thickness $T_F$ may be between 0% and 150% of the thickness $T_d$. In an embodiment, the radial thickness $T_F$ is between 50% and 100% of the thickness $T_d$.

A strain concentration at the deformable portion 576 may allow the axially leading end 558 to plastically deform relative to the base 570 as the right torque nut 524 is made or remade against the axially inwardly facing shoulder 560.

The thickness $T_d$ may be between 5% and 50% of a radial thickness $T_C$ of an axially central portion, such as the central body 578, of the right torque nut 524. In an embodiment, the deformable portion has a thickness of between 20% and 30% the radial thickness of an axially central portion.

The axial length L may be configured based on the desired amount of remakes of the torque nut 124. The axial length L may be between 100% and 400% of the thickness $T_d$. In an embodiment, the axial length L is between the thickness $T_d$ and 200% of the thickness $T_d$. For example, the axial length L may be equal to or approximately equal to the thickness $T_d$. In an embodiment, the axial length L is between the thickness $T_d$ and 100% of the radial thickness $T_C$. In another embodiment, the axial length L is configured to prevent the axially leading end from deforming radially inward radially even with the axially inner threaded end portion 574 and/or the axially inner threaded end portion 572.

Figure 6D:
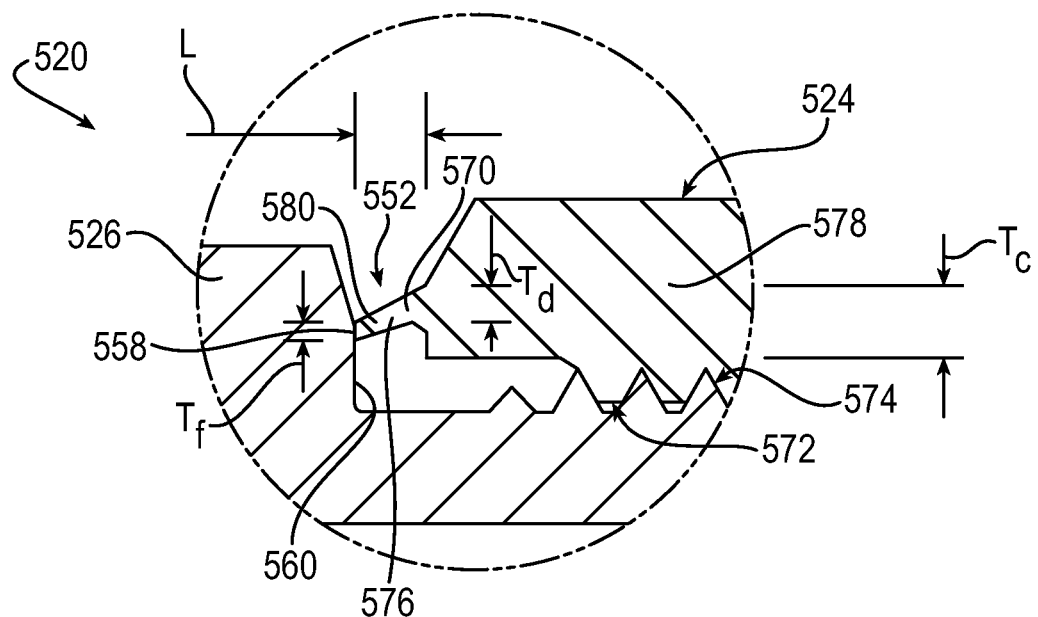
FIG. 6D is a front view of a partial cross-section of another exemplary union compression fitting in a madeup position.

FIG. 6D illustrates a union compression fitting 520 that includes a fitting body 526 with a right torque nut 524 attached to the fitting body 526. The right torque nut 524 may include an axially deformable projection 552 and the fitting body 526 may include an axially inwardly facing shoulder 560 for engaging an axially leading end 558 of the axially deformable projection 552.

The axially deformable projection 552 may include a deformable portion 576 disposed radially offset from the axially inner threaded end portion 572. The axially leading end 558 may be configured to deform radially relative to the deformation portion 576 as the deformable portion 576 initially deforms. For example, the axially leading end 558 may be and/or may extend radially inward of the deformable portion 576 prior to any deformation. The deformable portion 576 may be axially offset from the axially leading end 558.

The deformable portion 576 may be formed by a thin radially and axially extending annular wall 580 that extends from a base 570 to the axially leading end 558. The annular wall 580 may progressively thin from the base 570 to the axially leading end 558. For example, the axially leading end 558 may have a radial thickness $T_F$ that is less than a thickness $T_d$ of the deformable portion 576. For example, the radial thickness $T_F$ may be 0% and 150% of the thickness $T_d$. In an embodiment, the radial thickness $T_F$ is between 50% and 100% of the thickness $T_d$.

The base 570 may be radially offset a distance that allows the axially deformable projection 552 to fully deform radially inwardly without interfering with the axially inner threaded end portion 574 when the right torque nut 524 is removed from the fitting body 526. For example, the base 570 may be radially outwardly offset from the axially inner threaded end portion 574 a distance that is equal to or greater than a length of the axially deformable projection 552 from the base 570 to the axially leading end 558. Thus, when the axially deformable projection 552 is fully deformed, the axially leading end 558 may remain radially offset from the axially inner threaded end portion 574.

A strain concentration at the deformable portion 576 may allow the axially leading end 558 to plastically deform relative to the base 570 as the right torque nut 524 is made or remade against the axially inwardly facing shoulder 560.

The thickness $T_d$ may be between 5% and 50% of a radial thickness $T_C$ of an axially central portion, such as the central body 578, of the right torque nut 524. In an embodiment, the deformable portion has a thickness of between 20% and 30% the radial thickness of an axially central portion.

Figure 6E:
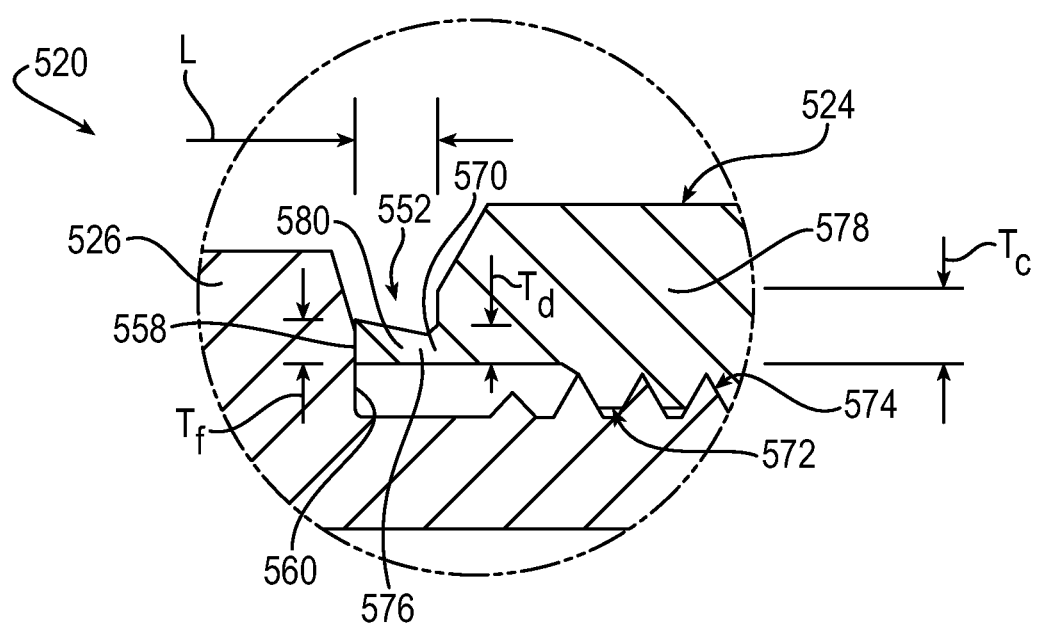
FIG. 6E is a front view of a partial cross-section of yet another exemplary union compression fitting in a madeup position.

FIG. 6E illustrates a union compression fitting 520 that includes a fitting body 526 with a right torque nut 524 attached to the fitting body 526. The right torque nut 524 may include an axially deformable projection 552 and the fitting body 526 may include an axially inwardly facing shoulder 560 for engaging an axially leading end 558 of the axially deformable projection 552.

The axially deformable projection 552 may include a deformable portion 576 disposed radially offset from the axially inner threaded end portion 572. The deformable portion 576 may also be axially offset from the axially leading end 558.

The deformable portion 576 may be formed by a thin radially and axially extending annular wall 580 that extends from a base 570 to the axially leading end 558. The annular wall 580 may have an axially sloped radially outward facing surface such that the annular wall 580 progressively thickens from the base 570 to the axially leading end 558. For example, the axially leading end 558 may have a radial thickness $T_F$ that is less than a thickness $T_d$ of the deformable portion 576. For example, the radial thickness $T_F$ may be between 0% and 150% of the thickness $T_d$. In an embodiment, the radial thickness $T_F$ is between 50% and 100% of the thickness $T_d$.

A strain concentration at the deformable portion 576 may allow the axially leading end 558 to plastically deform relative to the base 570 as the right torque nut 524 is made or remade against the axially inwardly facing shoulder 560.

The thickness $T_d$ may be between 5% and 50% of a radial thickness $T_C$ of an axially central portion, such as the central body 578, of the right torque nut 524. In an embodiment, the deformable portion has a thickness of between 20% and 30% the radial thickness of an axially central portion.

Turning now to FIGS. 7A-7D, exemplary embodiments of the union compression fitting are shown at 720. The union compression fittings 720 are substantially the same as the above-referenced compression fittings 120, 320 and 520, and consequently the same reference numerals but indexed by 200 are used to denote structures corresponding to similar structures in the union compression fittings. In addition, the foregoing descriptions of the union compression fittings 120, 320 and 520 are equally applicable to the union compression fittings 720 except as noted below. Moreover, it will be appreciated that aspects of the union compression fittings may be substituted for one another or used in conjunction with one another where applicable.

Figure 7A:
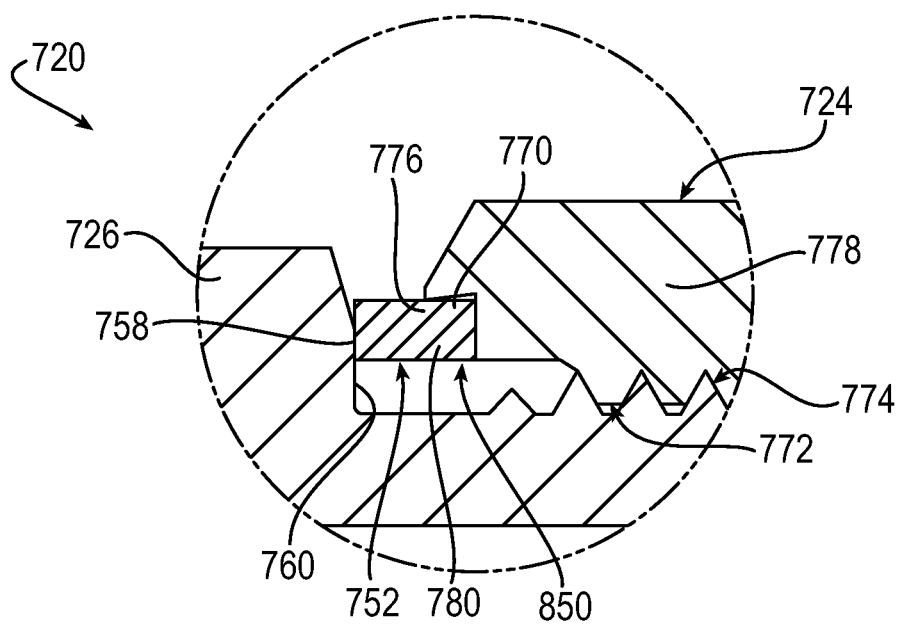
FIG. 7A is a front view of a partial cross-section of another exemplary union compression fitting having an insert in a madeup position.

FIG. 7A illustrates a union compression fitting 720 that includes a fitting body 726 with a right torque nut 724 attached to the fitting body 726. The right torque nut 724 may include an axially deformable projection 752 and the fitting body 726 may include an axially inwardly facing shoulder 760 for engaging an axially leading end 758 of the axially deformable projection 752. The axially deformable projection 752 may be initially separate from a central body 778, for example the axially deformable projection 752 may be an annular insert that may be received by the right torque nut 724. The axially deformable projection 752 may have a rectangular cross-section, and may have a radially outward facing concave surface.

The axially deformable projection 752 may include a deformable portion 776 disposed radially offset from an axially inner threaded end portion 772. The deformable portion 776 may also be axially offset from the axially leading end 758.

The deformable portion 776 may be formed by a radially and axially extending annular wall 780 that extends axially from a base 770 to the axially leading end 758.

A strain concentration at the deformable portion 776 may allow the axially leading end 758 to plastically deform relative to the base 770 as the right torque nut 724 is made or remade against the axially inwardly facing shoulder 760.

The base 770 is squeezed into an axially facing concave portion 850 of the right torque nut 724 during makeup. The base 770 may initially deform to expand radially inwardly and radially outwardly into the concave portion 850 as the right torque nut 724 advances against the axially inwardly facing shoulder 760. After deforming into the concave portion 850, the deformable portion 776 may deform further to allow further makeup or remake of a corresponding ferrule assembly (not shown). The deformation of the deformable portion 776 may be more axial deformation than radial deformation.

The concave portion 850 may open toward the axially inwardly facing shoulder 760 for receiving the axially deformable projection 752 at a position radially offset from an axially inner threaded end portion 774 and/or the axially inner threaded end portion 772. As the right torque nut 724 advances toward the axially inwardly facing shoulder 760 the base 770 may deform radially outwardly to press-fit the insert against a radially inward facing shoulder that forms a portion of the concave portion 850. Thus, the insert may be integral with the central body 778. The insert may also be fixed relative to the central body 778.

The axially deformable projection 752 may be made of any suitable material that allows the axially deformable projection 752 to deform prior to another portion of the right torque nut 724. The axially deformable projection 752 may be made from a soft powdered metal, a plastic material or a porous material. The porous material may provide a weather shield and may resist deformation.

The axially deformable projection 752 may have a yield strength of anywhere from 20% to 100% the yield strength of the central body 778.

Figure 7B:
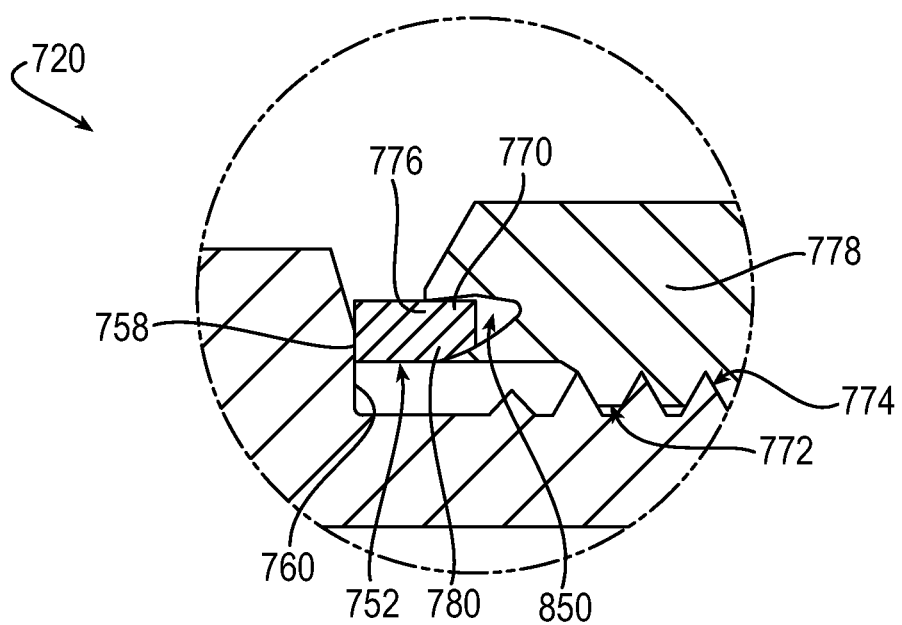
FIG. 7B is a front view of a partial cross-section of yet another exemplary union compression fitting having an insert in a madeup position.

FIG. 7B illustrates a union compression fitting 720 that includes a fitting body 726 with a right torque nut 724 attached to the fitting body 726. The right torque nut 724 may include an axially deformable projection 752 and the fitting body 726 may include an axially inwardly facing shoulder 760 for engaging an axially leading end 758 of the axially deformable projection 752. The axially deformable projection 752 may be initially separate from a central body 778, for example the axially deformable projection 752 may be an annular insert that may be received by the right torque nut 724. The axially deformable projection 752 may have an approximately rectangular cross-section, which may be a rectangular cross-section in some embodiments, and may have a radially outward facing concave surface.

The axially deformable projection 752 may include a deformable portion 776 disposed radially offset from an axially inner threaded end portion 772. The deformable portion 776 may also be axially offset from the axially leading end 758.

The deformable portion 776 may be formed by a radially and axially extending annular wall 780 that extends axially from a base 770 to the axially leading end 758.

A strain concentration at the deformable portion 776 may allow the axially leading end 758 to plastically deform relative to the base 770 as the right torque nut 724 is made or remade against the axially inwardly facing shoulder 760. The base 770 is squeezed into an axially facing concave portion 850 of the right torque nut 724 during makeup.

The base 770 may initially deform into the concave portion 850 as the right torque nut 724 advances against the axially inwardly facing shoulder 760. After deforming into the concave portion 850, the deformable portion 776 may deform to allow further makeup or remake of a corresponding ferrule assembly (not shown).

The concave portion 850 may open toward the axially inwardly facing shoulder 760 for receiving the axially deformable projection 752 at a position radially offset from an axially inner threaded end portion 774 and/or the axially inner threaded end portion 772. For example, the concave portion 850 may extend radially outward and axially away from the base 770.

As the right torque nut 724 advances toward the axially inwardly facing shoulder 760 the base 770 may deform radially outwardly to press-fit the insert against a radially inward facing shoulder that forms a portion of the concave portion 850. Thus, the insert may be integral with the central body 778. The insert may also be fixed relative to the central body 778.

The axially deformable projection 752 may be made of any suitable material that allows the axially deformable projection 752 to deform prior to another portion of the right torque nut 724. The axially deformable projection 752 may be made from a soft powdered metal, a plastic material or a porous material. For example, the axially deformable projection 752 may have a yield strength of anywhere from 20% to 100% the yield strength of the central body 778.

Figure 7C:
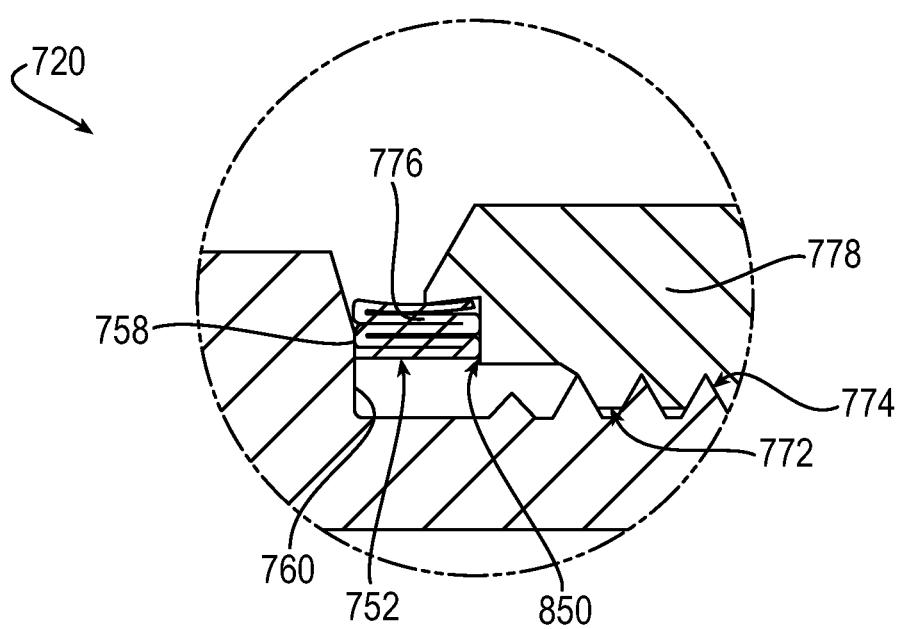
FIG. 7C is a front view of a partial cross-section of a further exemplary union compression fitting having an insert in a madeup position.

FIG. 7C illustrates a union compression fitting 720 that includes a fitting body 726 with a right torque nut 724 attached to the fitting body 726. The right torque nut 724 may include an axially deformable projection 752 and the fitting body 726 may include an axially inwardly facing shoulder 760 for engaging an axially leading end 758 of the axially deformable projection 752. The axially deformable projection 752 may be initially separate from a central body 778, for example the axially deformable projection 752 may be an annular insert that may be received by the right torque nut 724. The axially deformable projection 752 may have a billowed cross-section.

The axially deformable projection 752 may include a deformable portion 776 disposed radially offset from an axially inner threaded end portion 772. The deformable portion 776 may also be axially offset from the axially leading end 758.

The deformable portion 776 may be formed by a radially and axially extending annular wall 780 that extends axially from a base 770 to the axially leading end 758.

A strain concentration at the deformable portion 776 may allow the axially leading end 758 to plastically deform relative to the base 770 as the right torque nut 724 is made or remade against the axially inwardly facing shoulder 760. The base 770 is squeezed into an axially facing concave portion 850 of the right torque nut 724 during makeup. The base 770 may initially deform to expand radially inwardly and radially outwardly into the concave portion 850 as the right torque nut 724 advances against the axially inwardly facing shoulder 760. After deforming into the concave portion 850, the deformable portion 776 may deform to allow further makeup or remake of a corresponding ferrule assembly (not shown). The deformation of the deformable portion 776 may be more axial deformation than radial deformation.

The concave portion 850 may open toward the axially inwardly facing shoulder 760 for receiving the axially deformable projection 752 at a position radially offset from an axially inner threaded end portion 774 and/or the axially inner threaded end portion 772. As the right torque nut 724 advances toward the axially inwardly facing shoulder 760 the base 770 may deform radially outwardly to press-fit the insert against a radially inward facing shoulder that forms a portion of the concave portion 850. Thus, the insert may be integral with the central body 778. The insert may also be fixed relative to the central body 778.

The axially deformable projection 752 may be made of any suitable material that allows the axially deformable projection 752 to deform prior to another portion of the right torque nut 724. For example, the axially deformable projection 752 may have a yield strength based on a geometric shape of the axially deformable projection 752.

Figure 7D:
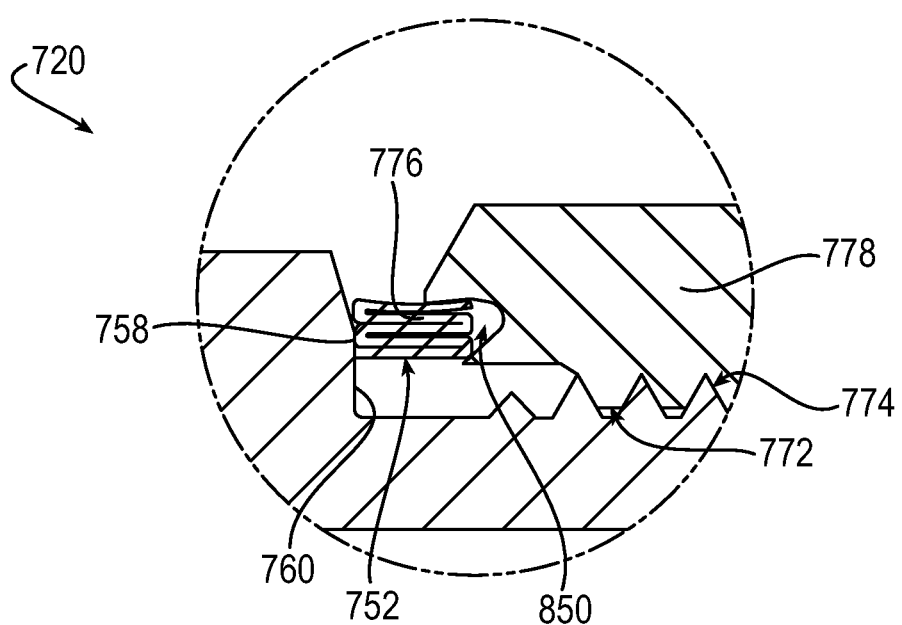
FIG. 7D is a front view of a partial cross-section of a still further exemplary union compression fitting having an insert in a madeup position.

FIG. 7D illustrates a union compression fitting 720 that includes a fitting body 726 with a right torque nut 724 attached to the fitting body 726. The right torque nut 724 may include an axially deformable projection 752 and the fitting body 726 may include an axially inwardly facing shoulder 760 for engaging an axially leading end 758 of the axially deformable projection 752. The axially deformable projection 752 may be initially separate from a central body 778, for example the axially deformable projection 752 may be an annular insert that may be received by the right torque nut 724. The axially deformable projection 752 may have a billowed cross-section.

The axially deformable projection 752 may include a deformable portion 776 disposed radially offset from an axially inner threaded end portion 772. The deformable portion 776 may also be axially offset from the axially leading end 758.

The deformable portion 776 may be formed by a radially and axially extending annular wall 780 that extends axially from a base 770 to the axially leading end 758.

A strain concentration at the deformable portion 776 may allow the axially leading end 758 to plastically deform relative to the base 770 as the right torque nut 724 is made or remade against the axially inwardly facing shoulder 760. The base 770 is squeezed into an axially facing concave portion 850 of the right torque nut 724 during makeup.

The base 770 may initially deform into the concave portion 850 as the right torque nut 724 advances against the axially inwardly facing shoulder 760. After deforming into the concave portion 850, the deformable portion 776 may deform to allow further makeup or remake of a corresponding ferrule assembly (not shown).

The concave portion 850 may open toward the axially inwardly facing shoulder 760 for receiving the axially deformable projection 752 at a position radially offset from an axially inner threaded end portion 774 and/or the axially inner threaded end portion 772. For example, the concave portion 850 may extend radially outward and axially away from the base 770.

As the right torque nut 724 advances toward the axially inwardly facing shoulder 760 the base 770 may deform radially outwardly to press-fit the insert against a radially inward facing shoulder that forms a portion of the concave portion 850. Thus, the insert may be integral with the central body 778. The insert may also be fixed relative to the central body 778.

The axially deformable projection 752 may be made of any suitable material that allows the axially deformable projection 752 to deform prior to another portion of the right torque nut 724. For example, the axially deformable projection 752 may have a yield strength based on a geometric shape of the axially deformable projection 752.

Turning now to FIGS. 8A-8D, exemplary embodiments of the union compression fitting are shown at 920. The union compression fittings 920 are substantially the same as the above-referenced compression fittings 120, 320, 520 and 720, and consequently the same reference numerals but indexed by 200 are used to denote structures corresponding to similar structures in the union compression fittings. In addition, the foregoing descriptions of the union compression fittings 120, 320, 520 and 720 are equally applicable to the union compression fittings 920 except as noted below. Moreover, it will be appreciated that aspects of the union compression fittings may be substituted for one another or used in conjunction with one another where applicable.

Figure 8A:
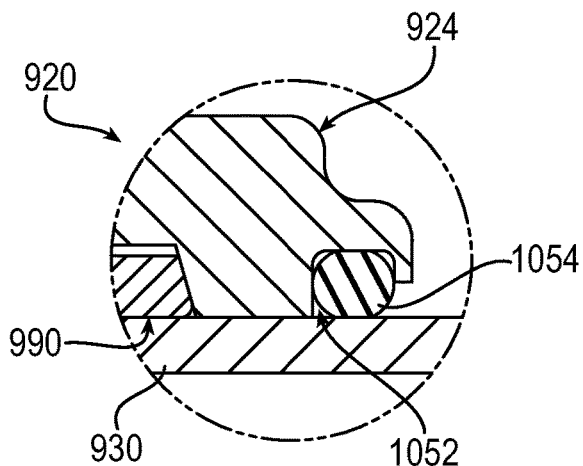
FIG. 8A is a front view of a partial cross-section of another exemplary union compression fitting having a back seal for preventing fluid flow between a torque nut and a tube of the union compression fitting.

FIG. 8A illustrates a union compression fitting 920 that includes a right torque nut 924, a ferrule assembly 990 and a tube 930. The torque nut 924 may include a concave portion 1052 at a back end of the right torque nut 924. The concave portion 1052 may be partially formed by an annular radially inward facing shoulder of the right torque nut 924. A radially inwardly extending flange at the back end may prevent provide an axially facing shoulder to partially form the concave portion 1052.

A seal 1054 may be disposed within the concave portion 1052 to seal against an outer surface of the tube 930. The seal 1054 may protect the ferrule assembly 990 from an external fluid by sealing against the tube 930.

The seal 1054 may be an O-ring seal. For example, the seal 1054 may be a rubber O-ring seal. In an embodiment, the seal has another suitable cross-section. In another embodiment, the seal is any suitable elastomeric material disposed within the concave portion to seal against the concave portion and the tube.

When the right torque nut 924 is madeup against a corresponding fitting body, (e.g., the fitting body 126 as shown in FIG. 2B), a seal 1054 may form between the right torque nut 924 and the corresponding fitting body. Thus, when the right torque nut 924 is madeup, external fluid may be prevented from reaching interior portions of the right torque nut 924, the ferrule assembly 990 and the corresponding fitting body.

Figure 8B:
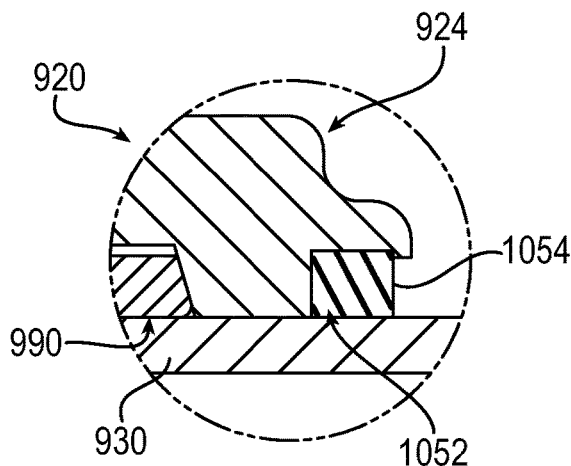
FIG. 8B is a front view of a partial cross-section of yet another exemplary union compression fitting having a back seal.

FIG. 8B illustrates a union compression fitting 920 that includes a right torque nut 924, a ferrule assembly 990 and a tube 930. The torque nut 924 may include a concave portion 1052 at a back end of the right torque nut 924. The concave portion 1052 may be partially formed by an annular radially inward facing shoulder of the right torque nut 924. A radially inwardly extending flange at the back end may prevent provide an axially facing shoulder to partially form the concave portion 1052.

A seal 1054 may be disposed within the concave portion 1052 to seal against an outer surface of the tube 930. The seal 1054 may protect the ferrule assembly 990 from an external fluid by sealing against the tube 930.

The seal 1054 may be an annular seal with a quadrilateral cross-section. For example, the seal 1054 may be a rubber annular seal. In an embodiment, the seal has another suitable cross-section. In another embodiment, the seal is made of an elastomeric material disposed in the concave portion, such as a rubber material that is inserted into the concave portion or bonded into the concave portion.

When the right torque nut 924 is madeup against a corresponding fitting body, (e.g., the fitting body 126 as shown in FIG. 2B), a seal 1054 may form between the right torque nut 924 and the corresponding fitting body. Thus, when the right torque nut 924 is madeup, external fluid may be prevented from reaching interior portions of the right torque nut 924, the ferrule assembly 990 and the corresponding fitting body.

Figure 8C:
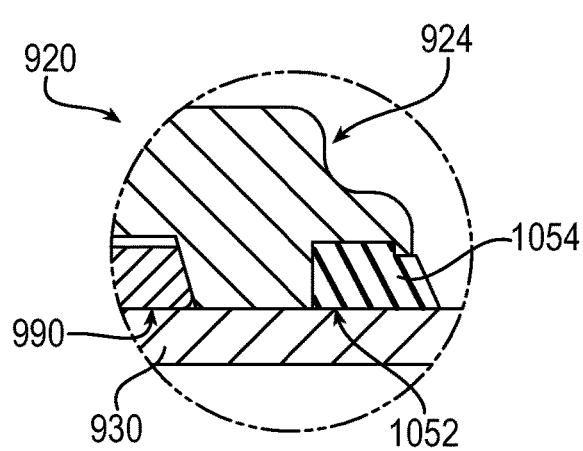
FIG. 8C is a front view of a partial cross-section of a further exemplary union compression fitting having a back seal.

FIG. 8C illustrates a union compression fitting 920 that includes a right torque nut 924, a ferrule assembly 990 and a tube 930. The torque nut 924 may include a concave portion 1052 at a back end of the right torque nut 924. The concave portion 1052 may be partially formed by an annular radially inward facing shoulder of the right torque nut 924. A radially inwardly extending flange at the back end may prevent provide an axially facing shoulder to partially form the concave portion 1052.

A seal 1054 may be disposed within the concave portion 1052 to seal against an outer surface of the tube 930. The seal 1054 may protect the ferrule assembly 990 from an external fluid by sealing against the tube 930.

The seal 1054 may be an annular seal with a cross-section of a trapezium with a radially outward triangular portion removed. In an embodiment, the seal has another suitable cross-section.

The seal 1054 may be a rubber annular seal. In an embodiment, the seal is made of an elastomeric material disposed in the concave portion, such as a rubber material that is inserted into the concave portion or bonded into the concave portion.

When the right torque nut 924 is madeup against a corresponding fitting body, (e.g., the fitting body 126 as shown in FIG. 2B), a seal 1054 may form between the right torque nut 924 and the corresponding fitting body. Thus, when the right torque nut 924 is madeup, external fluid may be prevented from reaching interior portions of the right torque nut 924, the ferrule assembly 990 and the corresponding fitting body.

Figure 8D:
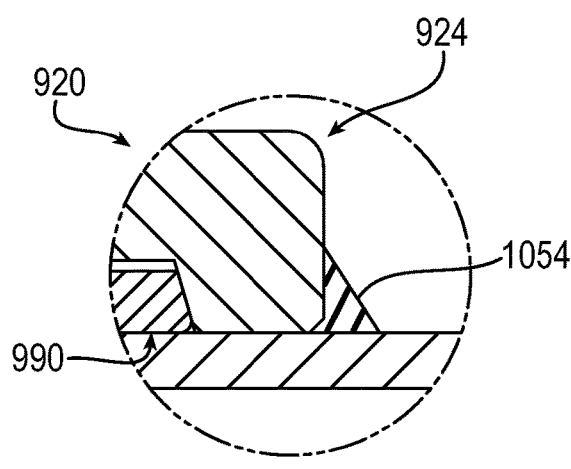
FIG. 8D is a front view of a partial cross-section of a still further exemplary union compression fitting having a back seal.

FIG. 8D illustrates a union compression fitting 920 that includes a right torque nut 924, a ferrule assembly 990 and a tube 930.

A seal 1054 may be disposed at a back end of the right torque nut 924 to seal against an outer surface of the tube 930. The seal 1054 may protect the ferrule assembly 990 from an external fluid by sealing against the tube 930.

The seal 1054 may be an annular seal with any suitable cross-section. For example, the seal 1054 may have a triangular cross-section with an axially deformable projection extending between a radially inward portion of the right torque nut 924 and the outer surface of the tube 930.

The seal 1054 may be a rubber annular seal. In an embodiment, the seal is made of an elastomeric material, such as a rubber material that is inserted on a back end of the torque nut or bonded to the back end of the torque nut. In another embodiment, the seal is made of a flexible tape wrapped circumferentially around the tube. For example, the torque nut may have any suitable back end and the flexible tape may seal a circumferential gap between the torque nut and the tube.

When the right torque nut 924 is madeup against a corresponding fitting body, (e.g., the fitting body 126 as shown in FIG. 2B), a seal 1054 may form between the right torque nut 924 and the corresponding fitting body. Thus, when the right torque nut 924 is madeup, external fluid may be prevented from reaching interior portions of the right torque nut 924, the ferrule assembly 990 and the corresponding fitting body.

Turning now to FIGS. 9A-9M, exemplary embodiments of the union compression fitting are shown at 1120. The union compression fittings 1120 are substantially the same as the above-referenced compression fittings 120, 320, 520, 720 and 920, and consequently the same reference numerals but indexed by 200 are used to denote structures corresponding to similar structures in the union compression fittings. In addition, the foregoing descriptions of the union compression fittings 120, 320, 520, 720 and 920 are equally applicable to the union compression fittings 1120 except as noted below. Moreover, it will be appreciated that aspects of the union compression fittings may be substituted for one another or used in conjunction with one another where applicable.

The union compression fittings 1120 may be made and remade similar to the above compression fittings. Thus, the union compression fittings 1120 may include a torque nut that easily assembled based on feel of an abrupt increase in torque needed to tighten the torque. During assembly the abrupt increase in torque needed to tighten the torque nut indicating that the torque nut has been tightened sufficiently.

FIG. 9A illustrates a union compression fitting 1120 that includes a right torque nut 1124, and a fitting body 1126 having a stop collar 1260 forming an axially inwardly facing shoulder of the fitting body. The stop collar 1260 may be an annular stop collar with an approximately rectangular cross-section, which may be a rectangular cross-section in some embodiments.

Prior to the right torque nut 1124 being madeup, the stop collar 1260 may be rotatable about the central axis. After makeup the right torque nut 1124 (e.g., the right torque nut 124 of FIG. 2B) may exert an axially compressive force against an annular radially inward facing shoulder formed by an axially facing surface of the stop collar 1260. The compressive force may fix the stop collar 1260 relative to the fitting body 1126 and the right torque nut 1124. A user may be unable to rotate the stop collar 1260 relative to the nut 1124 once the nut 1124 is madeup. Thus, after or during final assembly the stop collar 1260 may be an indicator of whether the right torque nut 1124 is madeup.

Figure 9B:
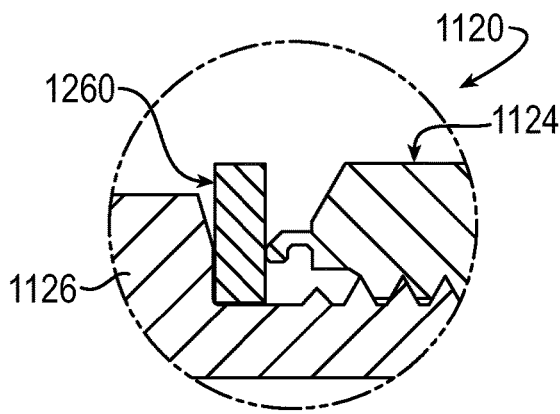
FIG. 9B is a front view of a partial cross-section of yet another exemplary union compression fitting with a fitting body having a stop collar assembly and being in a madeup position.

FIG. 9B illustrates a union compression fitting 1120 that includes a right torque nut 1124, and a fitting body 1126 having a stop collar 1260 forming an axially inwardly facing shoulder of the fitting body. The stop collar 1260 may be an annular stop collar with a rectangular cross-section.

Prior to the right torque nut 1124 being madeup, the stop collar 1260 may be rotatable about the central axis. After makeup the right torque nut 1124 (e.g., the right torque nut 524 of FIG. 6A) may exert an axially compressive force against an annular radially inward facing shoulder formed by an axially facing surface of the stop collar 1260. The compressive force may fix the stop collar 1260 relative to the fitting body 1126 and the right torque nut 1124. A user may be unable to rotate the stop collar 1260 relative to the nut 1124 once the nut 1124 is madeup. Thus, after or during final assembly the stop collar 1260 may be an indicator of whether the right torque nut 1124 is madeup.

Figure 9C:
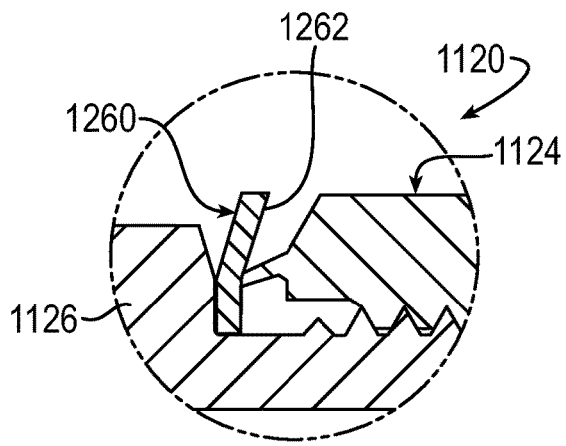
FIG. 9C is a front view of a partial cross-section of a further exemplary union compression fitting with a fitting body having a stop collar assembly and in being a position just prior to makeup.
Figure 9D:
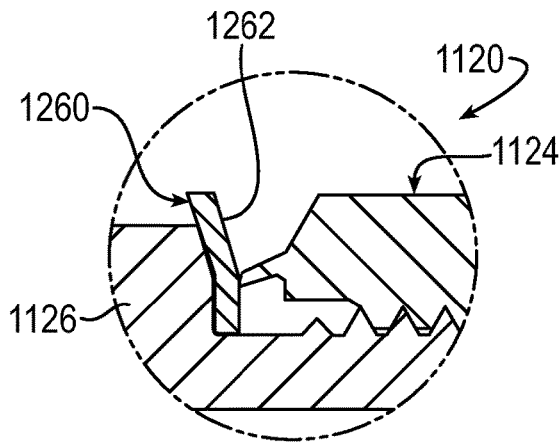
FIG. 9D is a front view of a partial cross-section of the union compression fitting of FIG. 9C in a madeup position.

FIGS. 9C and 9D illustrate a union compression fitting 1120 that includes a right torque nut 1124, and a fitting body 1126 having a stop collar 1260 forming an axially inwardly facing shoulder of the fitting body. The stop collar 1260 may be an annular stop collar with an axially extending radially outward portion 1262. For example, the stop collar 1260 may have a frustoconical shape. As shown in FIG. 9C, prior to makeup of the right torque nut 1124, the axially extending radially outward portion 1262 may extend toward the right torque nut 1124. Prior to makeup, the stop collar 1260 may also be rotatable about the central axis.

Referring now to FIG. 9D, after makeup of the right torque nut 1124 (e.g., the right torque nut 524 of FIG. 6D) may exert an axially compressive force against an annular radially inward facing shoulder formed by an axial facing surface of the axially extending radially outward portion 1262. The compressive force may deform the stop collar such that the axially extending radially outward portion 1262 may extend away from the right torque nut 1124. The deformation may be a visual indication that the right torque nut 1124 is madeup.

The compressive force may also fix the stop collar 1260 relative to the fitting body 1126 and the right torque nut 1124. A user may be unable to rotate the stop collar 1260 relative to the nut 1124 once the nut 1124 is madeup. Thus, the stop collar 1260 may be an indicator of whether the right torque nut 1124 is madeup.

Figure 9E:
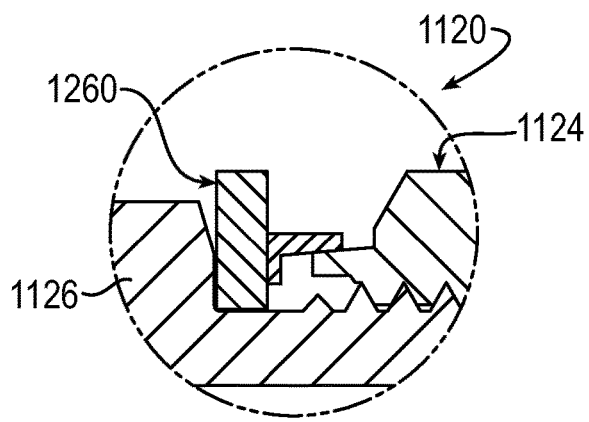
FIG. 9E is a front view of a partial cross-section of a still further exemplary union compression with a fitting body fitting having a stop collar assembly and being in a madeup position.

FIG. 9E illustrates a union compression fitting 1120 that includes a right torque nut 1124, and a fitting body 1126 having a stop collar 1260 forming an axially inwardly facing shoulder of the fitting body. The stop collar 1260 may be an annular stop collar with a rectangular cross-section.

Prior to the right torque nut 1124 being madeup, the stop collar 1260 may be rotatable about the central axis. After makeup the right torque nut 1124 (e.g., the right torque nut 524 of FIG. 6B) may exert an axially compressive force against an annular radially inward facing shoulder formed by an axially facing surface of the stop collar 1260. The compressive force may fix the stop collar 1260 relative to the fitting body 1126 and the right torque nut 1124. A user may be unable to rotate the stop collar 1260 relative to the nut 1124 once the nut 1124 is madeup. Thus, the stop collar 1260 may be an indicator of whether the right torque nut 1124 is madeup.

Figure 9F:
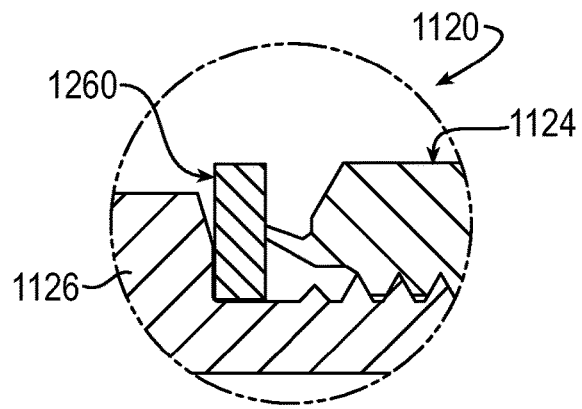
FIG. 9F is a front view of a partial cross-section of another exemplary union compression fitting with a fitting body having a stop collar assembly and being in a madeup position.

FIG. 9F illustrates a union compression fitting 1120 that includes a right torque nut 1124, and a fitting body 1126 having a stop collar 1260 forming an axially inwardly facing shoulder of the fitting body. The stop collar 1260 may be an annular stop collar with a rectangular cross-section.

Prior to the right torque nut 1124 being madeup, the stop collar 1260 may be rotatable about the central axis. After makeup the right torque nut 1124 (e.g., the right torque nut 524 of FIG. 6C) may exert an axially compressive force against an annular radially inward facing shoulder formed by an axially facing surface of the stop collar 1260. The compressive force may fix the stop collar 1260 relative to the fitting body 1126 and the right torque nut 1124. A user may be unable to rotate the stop collar 1260 relative to the nut 1124 once the nut 1124 is madeup. Thus, the stop collar 1260 may be an indicator of whether the right torque nut 1124 is madeup.

Figure 9G:
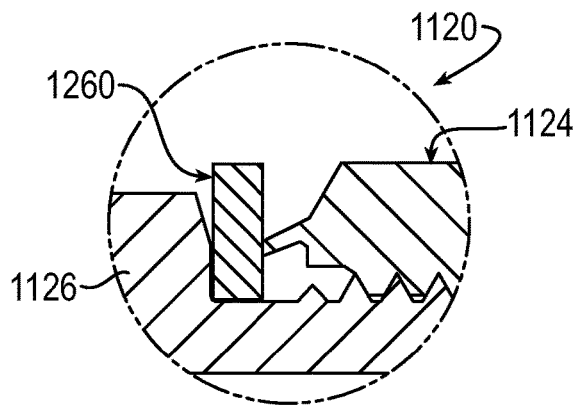
FIG. 9G is a front view of a partial cross-section of yet another exemplary union compression fitting with a fitting body having a stop collar assembly and being in a madeup position.

FIG. 9G illustrates a union compression fitting 1120 that includes a right torque nut 1124, and a fitting body 1126 having a stop collar 1260 forming an axially inwardly facing shoulder of the fitting body. The stop collar 1260 may be an annular stop collar with a rectangular cross-section.

Prior to the right torque nut 1124 being madeup, the stop collar 1260 may be rotatable about the central axis. After makeup the right torque nut 1124 (e.g., the right torque nut 524 of FIG. 6D) may exert an axially compressive force against an annular radially inward facing shoulder formed by an axially facing surface of the stop collar 1260. The compressive force may fix the stop collar 1260 relative to the fitting body 1126 and the right torque nut 1124. A user may be unable to rotate the stop collar 1260 relative to the nut 1124 once the nut 1124 is madeup. Thus, the stop collar 1260 may be an indicator of whether the right torque nut 1124 is madeup.

Figure 9H:
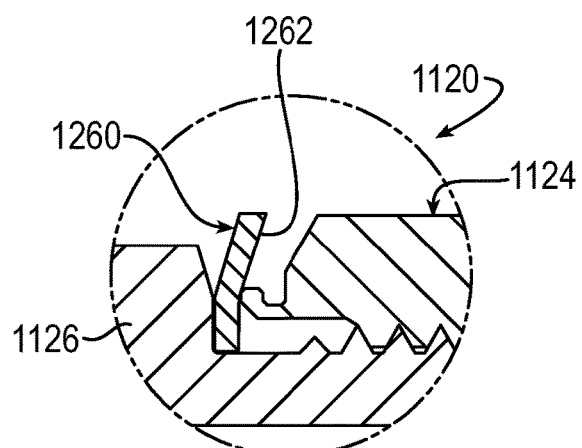
FIG. 9H is a front view of a partial cross-section of a further exemplary union compression fitting with a fitting body having a stop collar assembly and being in a position just prior to makeup.
Figure 9I:
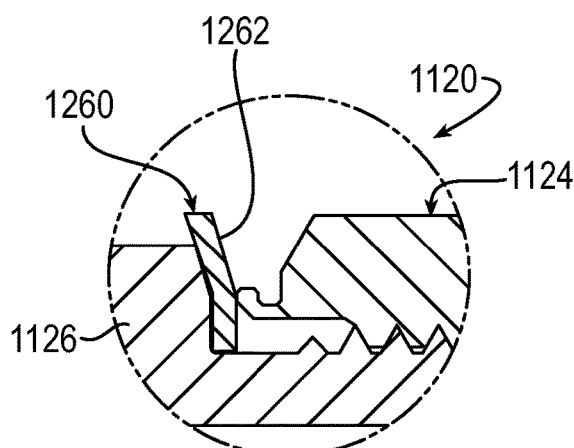
FIG. 9I is a front view of a partial cross-section of the union compression fitting of FIG. 9H in a madeup position.

FIGS. 9H and 9I illustrate a union compression fitting 1120 that includes a right torque nut 1124, and a fitting body 1126 having a stop collar 1260 forming an axially inwardly facing shoulder of the fitting body. The stop collar 1260 may be an annular stop collar with an axially extending radially outward portion 1262. For example, the stop collar 1260 may have a frustoconical shape. As shown in FIG. 9H, prior to makeup of the right torque nut 1124, the axially extending radially outward portion 1262 may extend toward the right torque nut 1124. Prior to makeup, the stop collar 1260 may also be rotatable about the central axis.

Referring now to FIG. 9I, after makeup of the right torque nut 1124 (e.g., the right torque nut 124 of FIG. 2B) may exert an axially compressive force against an annular radially inward facing shoulder formed by an axial facing surface of the axially extending radially outward portion 1262. The compressive force may deform the stop collar such that the axially extending radially outward portion 1262 may extend away from the right torque nut 1124. The deformation may be a visual indication that the right torque nut 1124 is madeup.

The compressive force may also fix the stop collar 1260 relative to the fitting body 1126 and the right torque nut 1124. A user may be unable to rotate the stop collar 1260 relative to the nut 1124 once the nut 1124 is madeup. Thus, the stop collar 1260 may be an indicator of whether the right torque nut 1124 is madeup.

Figure 9J:
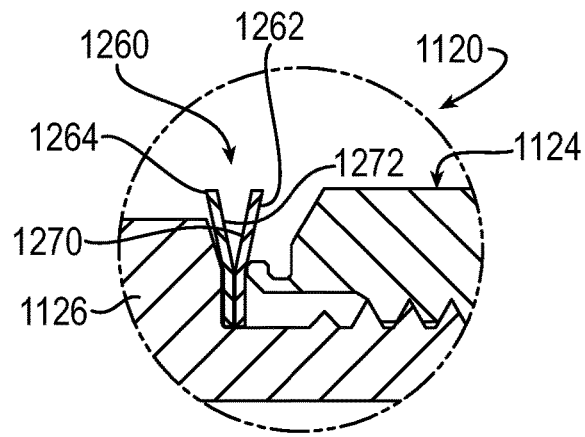
FIG. 9J is a front view of a partial cross-section of a still further exemplary union compression fitting with a fitting body having a stop collar assembly and being in a position just prior to makeup.
Figure 9K:
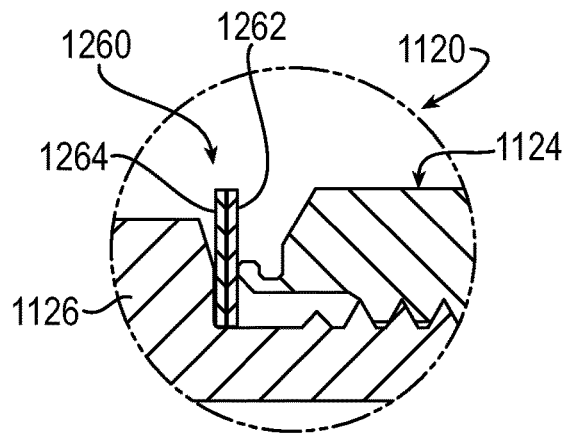
FIG. 9K is a front view of a partial cross-section of the union compression fitting of FIG. 9J in a madeup position.

FIGS. 9J and 9K illustrate a union compression fitting 1120 that includes a right torque nut 1124, and a fitting body 1126 having a stop collar 1260 forming an axially inwardly facing shoulder of the fitting body. The stop collar 1260 may include a pair of annular stop collars, each with an axially extending radially outward portion 1262, 1264. For example, the stop collar 1260 may include a pair of Frustoconical shaped collars. As shown in FIG. 9J, prior to makeup of the right torque nut 1124, the axially extending radially outward portion 1262 may extend toward the right torque nut 1124, and the axially extending radially outward portion 1264 may extend away from the right torque nut 1124. Opposing axially and radially outwardly facing surfaces 1270, 1272 of the axially extending radially outward portions 1262, 1264 may have a different color than adjacent portions of the axially extending radially outward portions 1262, 1264. In an embodiment, the opposing axially and radially outwardly facing surfaces 1270, 1272 are colored red to indicate the right torque nut 1124 is not made up.

Prior to makeup, visibility of the opposing axially and radially outwardly facing surfaces 1270, 1272 may indicate that the right torque nut 1124 is not madeup. The stop collar 1260 may also be rotatable about the central axis to indicate that the right torque nut 1124 is not madeup.

Referring now to FIG. 9K, after makeup of the right torque nut 1124 (e.g., the right torque nut 124 of FIG. 2B) may exert an axially compressive force against an annular radially inward facing shoulder formed by an axial facing surface of the axially extending radially outward portion 1262. The compressive force may deform the stop collar such that the axially extending radially outward portions 1262, 1264 may extend axially parallel to one another. The deformation may be a visual indication that the right torque nut 1124 is madeup. For example, the opposing axially and radially outwardly facing surfaces 1270, 1272 may not be visible.

The compressive force may also fix the stop collar 1260 relative to the fitting body 1126 and the right torque nut 1124. A user may be unable to rotate the stop collar 1260 relative to the nut 1124 once the nut 1124 is madeup. Thus, the stop collar 1260 may be an indicator of whether the right torque nut 1124 is madeup.

Figure 9L:
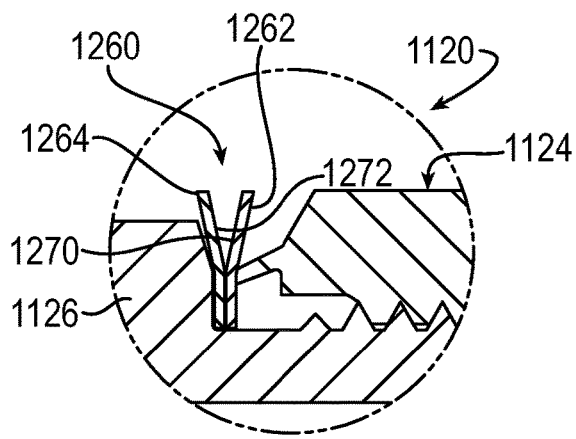
FIG. 9L is a front view of a partial cross-section of another exemplary union compression fitting with a fitting body having a stop collar assembly and being in a position just prior to makeup.
Figure 9M:
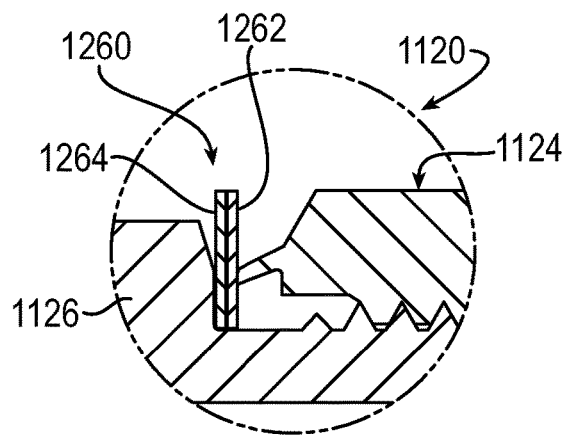
FIG. 9M is a front view of a partial cross-section of the union compression fitting of FIG. 9L in a madeup position.

FIGS. 9L and 9M illustrate a union compression fitting 1120 that includes a right torque nut 1124, and a fitting body 1126 having a stop collar 1260 forming an axially inwardly facing shoulder of the fitting body. The stop collar 1260 may include a pair of annular stop collars, each with an axially extending radially outward portion 1262, 1264. For example, the stop collar 1260 include a pair of Frustoconical shaped collars. As shown in FIG. 9L, prior to makeup of the right torque nut 1124, the axially extending radially outward portion 1262 may extend toward the right torque nut 1124, and the axially extending radially outward portion 1264 may extend away from the right torque nut 1124. Opposing axially and radially outwardly facing surfaces 1270, 1272 of the axially extending radially outward portions 1262, 1264 may have a different color than adjacent portions of the axially extending radially outward portions 1262, 1264. In an embodiment, the opposing axially and radially outwardly facing surfaces 1270, 1272 are colored red to indicate the right torque nut 1124 is not made up.

Prior to makeup, visibility of the opposing axially and radially outwardly facing surfaces 1270, 1272 may indicate that the right torque nut 1124 is not madeup. The stop collar 1260 may also be rotatable about the central axis to indicate that the right torque nut 1124 is not madeup.

Referring now to FIG. 9M, after makeup of the right torque nut 1124 (e.g., the right torque nut 524 of FIG. 6D) may exert an axially compressive force against an annular radially inward facing shoulder formed by an axial facing surface of the axially extending radially outward portion 1262. The compressive force may deform the stop collar such that the axially extending radially outward portions 1262, 1264 may extend axially parallel to one another. The deformation may be a visual indication that the right torque nut 1124 is madeup. For example, the opposing axially and radially outwardly facing surfaces 1270, 1272 may not be visible.

The compressive force may also fix the stop collar 1260 relative to the fitting body 1126 and the right torque nut 1124. A user may be unable to rotate the stop collar 1260 relative to the nut 1124 once the nut 1124 is madeup. Thus, the stop collar 1260 may be an indicator of whether the right torque nut 1124 is madeup.

Referring again to FIGS. 2A-2C and 5A-5B and as discussed further below, the abrupt increase in torque required to advance the nut 122 or 124 may be a function of multiple factors, including a projection-body coefficient of friction $\mu_{pb}$ (FIG. 2B), a threading coefficient of friction $\mu_t$ (FIGS. 2B and 2C), the yield strength of the axially deformable projection 150 or 152, the shape and size of the axially deformable projection 150 or 152, a ferrule-body coefficient of friction $\mu_{fb}$ (FIG. 2C), and a ferrule-nut coefficient of friction $\mu_{fn}$ (FIG. 2C). The torque nut 122 or 124 may be configured with an increased or decreased value of each factor to provide the predetermined abrupt increase in torque required to advance the nut 122 or 124, which allows the user to feel the abrupt increase in torque required. The abrupt increase may be a 50% increase in the torque that would otherwise be required to advance the torque nut 122 or 124 if the axially inwardly facing shoulder 156 or 160 did not restrict movement of—or exert axial force upon—the torque nut 122 or 124.

Any or all of the below described coefficients of friction $\mu_{pb}$, $\mu_t$, $\mu_{fb}$, and $\mu_{fn}$ may be a kinetic coefficient of friction to provide the abrupt increase that would otherwise be required to advance the torque nut 122.

In an embodiment, the resulting abrupt increase may anywhere from a 20% to 50% in the torque that would otherwise be required to advance the torque nut if the axially inwardly facing shoulder did not restrict movement of—or exert axial force upon—the torque nut.

Wear and tear between the axially inner threaded end portion 172 or 200 of the torque nut 122 or 124 and the axially inner threaded end portion 174 or 202 of the fitting body 126 may be minimized by reducing axial force applied between the axially deformable projection 150 and the axially inwardly facing shoulder 156 or 160. The abrupt increase in torque required may still be provided by maximizing differences between the projection-body coefficient of friction $\mu_{pb}$ and the threading coefficient of friction $\mu_t$, the ferrule-body coefficient of friction $\mu_{fb}$, and/or the ferrule-nut coefficient of friction $\mu_{fn}$. For example, the thickness and/or the yield strength of the axially deformable projection 150 may be reduced. The abrupt increase in torque required to tighten the torque nut 122 or 124 may be provided by increasing the projection-body coefficient of friction $\mu_{pb}$ to increase a circumferential friction force between the axially leading end 154 or 158 and the axially inwardly facing shoulder 156 or 160.

Alternatively or in addition to the above, the thickness and/or the yield strength of the axially deformable projection 150 may be reduced and the abrupt increase in torque required may be provided by decreasing the ferrule-body coefficient of friction $\mu_{fb}$ and/or the ferrule-nut coefficient of friction $\mu_{fn}$. Such decreasing may reduce a circumferential friction force between the ferrule assembly 190 and the shoulder of the tube passage way of the respective torque nut 122 or 124, which allows the abrupt increase in torque required to be accentuated for the user to feel. Reducing the thickness and/or the yield strength of the axially deformable projection 150 may increase deformation and/or degradation due to wear and tear upon the axially deformable projection 150 or 152.

The wear and tear of the axially deformable projection 150 may be balanced with the wear and tear of the axially inner threaded end portion 172 or 200 and the axially inner threaded end portion 174 or 202. For example, the axially deformable projection 150 may be configured to have a lifespan similar to or the same as the axially inner threaded end portion 172 or 200 and the axially inner threaded end portion 174 or 202 to optimize thickness or the yield strength reductions of the axially deformable projection 150 or 152.

The torque nuts 122 or 124 may be configured to have coefficients of friction (e.g., $\mu_{pb}$, $\mu_t$, $\mu_{fb}$, and $\mu_{fn}$) between various engaging surfaces of the union compression fitting 120 to provide a predetermined increase to the abrupt increase in torque needed to tighten either torque nut 122 or 124 on the fitting body 126. Having a high projection-body coefficient of friction $\mu_{pb}$, such as a coefficient of anywhere from 0.2-0.8, or 0.3-0.6, may provide a high circumferential friction force that resists rotation of the torque nuts 122 or 124 to provide an abrupt increase in the torque needed to tighten the torque nuts 122 or 124. The torque nut 122 or 124 or the fitting body 126 may be configured to provide the high circumferential friction force based upon the maximum torque the user will be able to apply to advance the torque nut 122 or 124 to allow the user to advance the nut to makeup or remake the ferrule assembly 190.

Having a low coefficient of friction $\mu_t$, $\mu_{fn}$, or $\mu_{fb}$, such as a coefficient of anywhere from 0.1-0.3, or 0.15-0.25, may provide a low circumferential friction force that resists rotation of the torque nuts 122 and 124. The low circumferential friction force may reduce the torque needed to tighten either torque nut 122 or 124 prior to engagement of the axially leading end 154 or 158 with the axially inwardly facing shoulder 156 or 160. Reducing the torque needed prior to engagement allows an accentuation of the abrupt increase in torque needed to tighten the torque nut 122 or 124 on the fitting body 126 when the axially leading end 154 or 158 engages the axially inwardly facing shoulder 156 or 160.

The projection-body coefficient of friction $\mu_{pb}$ may be between the axially leading end 154 or 158 of the axially deformable projection 150 and the axially inwardly facing shoulder 156 or 160 of the fitting body 126. The projection-body coefficient of friction $\mu_{pb}$ may be greater than the threading coefficient of friction $\mu_t$ to accentuate of the abrupt increase in torque needed to tighten the torque nut 122 or 124. For example the projection-body coefficient of friction $\mu_{pb}$ may be anywhere from 10% to 500% greater than the threading coefficient of friction $\mu_t$ to accentuate of the abrupt increase. In an embodiment, projection-body coefficient of friction $\mu_{pb}$ is at least 10%, 20%, 50%, 100%, 200%, or 500% greater than the threading coefficient of friction $\mu_t$ to accentuate of the abrupt increase. In another embodiment, the projection-body coefficient of friction $\mu_{pb}$ is double the threading coefficient of friction $\mu_t$ to accentuate of the abrupt increase.

The projection-body coefficient of friction $\mu_{pb}$ may be defined by an average coefficient of friction of each combination of surfaces—of the axially deformable projection 150 or 152 and of the axially inwardly facing shoulder 156 or 160—that are engaged with one another. For example, as mentioned below, the axially deformable projection 150 or 152 may have a roughened surface (shown in FIG. 11) for engaging with the axially inwardly facing shoulder 156 or 160.

In an embodiment, the projection-body coefficient of friction $\mu_{pb}$ may be equal to a coefficient of friction between the ferrule assembly and a portion of the outer surface of the tube that the ferrule assembly engages during makeup. In another embodiment, the projection-body coefficient of friction $\mu_{pb}$ may or greater than the coefficient of friction between the ferrule assembly and the portion of the outer surface of the tube that the ferrule assembly engages during makeup.

Leaving every feature, of the union compression fitting 120, the same other than raising the projection-body coefficient of friction $\mu_{pb}$ allows the projection-body coefficient of friction $\mu_{pb}$ to increase the abrupt increase in torque needed to tighten the torque nut 122 or 124 on the fitting body 126.

The threading coefficient of friction $\mu_t$ may be between the axially inner threaded end portion 172 or 200 of the torque nut 122 or 124 and the axially inner threaded end portion 174 or 202 of the fitting body 126. The threading coefficient of friction $\mu_t$ may be defined by the an average coefficient of friction of each surface, of the axially inner threaded end portion 172 or 200, and each surface, of the axially inner threaded end portion 174 or 202 of the fitting body 126, that are engaged with one another. In an embodiment, the threading coefficient of friction $\mu_t$ may only be between loaded surfaces of each engaged axially inner threaded end portion.

Leaving every feature the same, of the union compression fitting 120, other than lowering the threading coefficient of friction $\mu_t$ allows the threading coefficient of friction pt to reduce the torque needed to tighten either torque nut 122 or 124 prior to engagement of either axially leading end 154 or 158 with the respective axially inwardly facing shoulder 156 or 160.

Rotating the torque nut 122 or 124 relative to the fitting body 126 to tighten the torque nut 122 or 124 onto the fitting body 126 may create resistance to rotation that is in part based on the threading coefficient of friction $\mu_t$. The axial force between the axially inner threaded end portion 172 or 200 of the torque nut 122 or 124 and the axially inner threaded end portion 174 or 202 of the fitting body 126 may increase the amount of torque required to further tighten the torque nut 122 or 124 based on the threading coefficient of friction $\mu_t$.

Once tightened to the finger tight position, the ferrule assembly 190 may abut the torque nut 122 or 124 and the fitting body 126. Further tightening of the torque nut 122 or 124 may increase resistance to rotation that is in part based on the threading coefficient of friction $\mu_t$, the ferrule-body coefficient of friction $\mu_{fb}$, and the ferrule-nut coefficient of friction $\mu_{fn}$, until the axially leading end 154 or 158 engages the axially inwardly facing shoulder 156 or 160.

Engaging the axially leading end 154 or 158 with the axially inwardly facing shoulder 156 or 160 of the fitting body 126 may create a resistance to rotation that is in part based on the projection-body coefficient of friction $\mu_{pb}$, as well as the coefficients of friction $\mu_t$, $\mu_{fb}$, and $\mu_{fn}$. The axial force between the axially leading end 154 or 158 and the axially inwardly facing shoulder 156 or 160 may increase the amount of torque required to further tighten the torque nut 122 or 124 as a multiple of the projection-body coefficient of friction $\mu_{pb}$. When the axially leading end 154 or 158 is initially engaged with the axially inwardly facing shoulder 156 or 160, the rise in torque required to further tighten the torque nut 122 or 124 may be abrupt based in part on the resistance to rotation due to the projection-body coefficient of friction $\mu_{pb}$ and the corresponding axial force.

As mentioned above, the projection-body coefficient of friction $\mu_{pb}$ may be greater than the threading coefficient of friction $\mu_t$ to accentuate the abrupt increase in torque needed to tighten the torque nut 122 or 124 on the fitting body 126. For example, raising the projection-body coefficient of friction $\mu_{pb}$ allows a user to feel an increased abrupt increase of torque needed to advance the torque nut 122 or 124, which accentuates the abrupt increase.

Alternatively or additionally, lowering the threading coefficient of friction $\mu_t$ allows a user to feel less initial increase in torque required to tighten the nut 122 or 124 while distanced from the axially inwardly facing shoulder 156 or 160. As the user tightens the torque nut 122 or 124 to engage the axially leading end 154 or 158 with the axially inwardly facing shoulder 156 or 160, the abrupt increase in torque needed to tighten the nut 122 or 124 may be felt by the user. Given the lower initial increase in torque required, the abrupt increase may be accentuated and easier to feel for the user.

Figure 10:
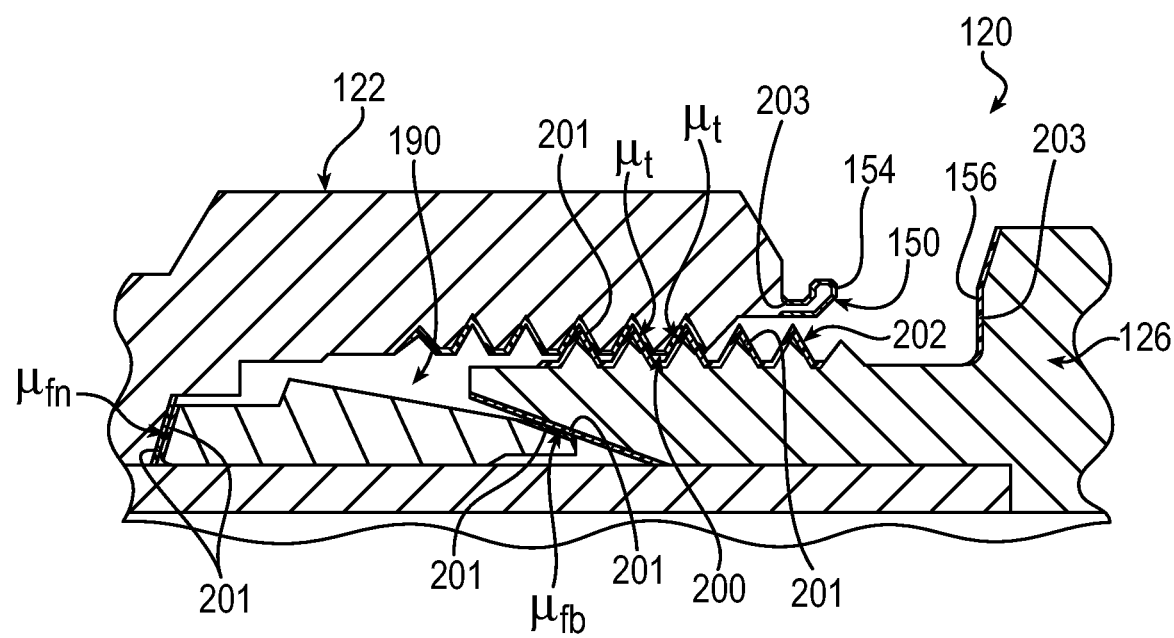
FIG. 10 is a front view of a partial cross-section of another embodiment of the union compression fitting with coatings configured to provide varying coefficients of friction.

Referring now to FIG. 10, the torque nut 122 is illustrated in a finger tight position, prior to makeup. The axially deformable projection 150, the axially inner threaded end portion 200, the axially inner threaded end portion 202, or the axially inwardly facing shoulder 156 may be coated to accentuate the abrupt increase in torque needed to tighten the torque nut 122.

The torque nut 122 may include a coating 201 that coats the axially inner threaded end portion 200. The coating 201 may be a lubricant, such as molybdenum disulfide, a wax, and/or another lubricant. In an embodiment, the entire torque nut is coated with a material, such as an anti-gallant, and the axially inner threaded end portion of the torque nut is coated in wax to reduce the threaded coefficient of friction $\mu_t$.

The axially facing surface, of the axially leading end 154, may have a portion that may be engageable with the axially inwardly facing shoulder 156 to cause an abrupt increase in torque needed to tighten the torque nut 122 on the fitting body 126. The portion of the axially facing surface may be lubricated or coated with a different material than the axially inner threaded portion 200. For example, the entire torque nut 122 may be coated with the coating 201 and a portion of the coating covering the axially deformable projection 150 may be removed. In an embodiment, only the portion of the coating that covers the axially facing surface of the axially leading end may be removed to increase the projection-body coefficient of friction $\mu_{pb}$.

In another embodiment, the axially inner threaded end portion of the torque nut has a surface finish that is configured to provide the threading coefficient of friction $\mu_t$ in conjunction with the axially inner threaded end portion of the fitting body. For example, the axially inner threaded end portion may have a surface finish of anywhere from 8-64 $R_a$, or anywhere from 16-32 $R_a$. The fitting body 126 may include the coating 201 that coats the axially inner threaded end portion 202. In another embodiment, the axially inner threaded end portion of the fitting body has a surface finish that is configured to provide the threading coefficient of friction $\mu_t$ in conjunction with the axially inner threaded end portion of the torque nut. For example, the axially inner threaded end portion may have a surface finish of anywhere from 8 to 64 $R_a$, or anywhere from 16-32 $R_a$. The axially leading end 154 may be configured to provide the projection-body coefficient of friction $\mu_{pb}$ of anywhere from 0.2-0.8, or anywhere from 0.3-0.6, with the axially inwardly facing shoulder 156.

The torque nut 122 may include a coating 203 that coats the axially deformable projection 150 to provide the projection-body coefficient of friction $\mu_{pb}$. For example, an anti-gallant may coat an axially facing surface of the axially leading end 154 such that the anti-gallant is engageable with the axially inwardly facing shoulder 156 of the fitting body 126 to cause an abrupt increase in torque needed to tighten the torque nut 122 on the fitting body 126. The anti-gallant may include silver plating or an epoxy paint to increase the projection-body coefficient of friction $\mu_{pb}$.

In an embodiment, the axially leading end 154 may be coated with any material configured that increases the projection-body coefficient of friction $\mu_{pb}$. In another embodiment, any portion of the axially deformable projection that may engage the axially inwardly facing shoulder of the fitting body is coated with an anti-gallant, such as silver plating or an epoxy paint. For example, the entire axially deformable projection may be coated.

In an embodiment, the axially leading end 154 may be lubricated. For example the entire torque nut 122 may be lubricated to lubricate the threaded portion 200. Lubrication on the axially leading end 154 may be removed to increase the projection-body coefficient of friction $\mu_{pb}$.

Figure 11:
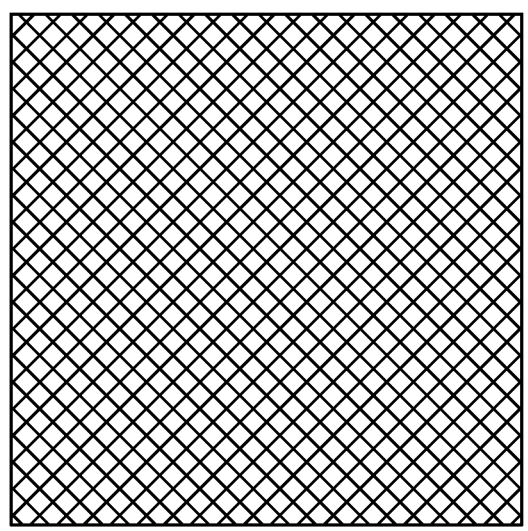
FIG. 11 is a plan view of a knurled surface of another embodiment of the union compression fitting.

The entire axially deformable projection 150 or a portion thereof may have a surface finish configured to provide the projection-body coefficient. The axially deformable projection 150 may have a surface finish of anywhere from 16 to 500 $R_a$, or anywhere from 32-64 $R_a$. For example, the surface finish may be a knurled finish as illustrated in FIG. 11 or a serrated surface finish.

The axially leading end 154 may have a surface finish that is configured to provide the projection-body coefficient of friction $\mu_{pb}$ in conjunction with the axially inwardly facing shoulder of the fitting body. For example, the axially leading end 154 may have surface finish of anywhere from 16 to 500 $R_a$, or anywhere from 32-64 $R_a$. In an embodiment, the axially leading end may have the knurled surface finish illustrated in FIG. 11 or a serrated surface finish.

The fitting body 126 may include the coating 203 that coats the axially inwardly facing shoulder 156 to provide the projection-body coefficient of friction $\mu_{pb}$. In an embodiment, any portion of the axially inwardly facing shoulder that may engage the axially deformable projection is coated with an anti-gallant, such as silver plating or an epoxy paint. For example, the entire axially inwardly facing shoulder may be coated.

In yet another embodiment, the axially inwardly facing shoulder 156 may have a surface finish configured to provide the projection-body coefficient. The axially inwardly facing shoulder 156 may have surface finish of anywhere from 16 to 500 $R_a$, or anywhere from 32-64 $R_a$. For example, the surface finish may be a knurled finish as illustrated in FIG. 11 or a serrated surface finish.

In another embodiment, the fitting body includes a collar or multiple collars that form the axially inwardly facing shoulder. The collar or multiple collars may have an inner axial face and an outer axial face with each face having the coating or surface finish configured provide the projection-body coefficient of friction $\mu_{pb}$. For example, any of the stop collars 1260 of FIGS. 9A-9M may be provided with the fitting body 126. The stop collars 1260 may have the coating 203 or surface finish on the inner axial face and the outer axial face of the stop collar 1260 to retrofit the fitting body 126 with the stop collars 1260 to provide the projection-body coefficient of friction $\mu_{pb}$.

In an alternative embodiment, the inner axial face and the outer axial face of the stop collar have a different coating or surface finish than the other to provide the projection-body coefficient of friction $\mu_{pb}$.

The features described above in relation to the torque nut 122, the ferrule assembly 190, and the corresponding side of the body 126 may be equally applicable to the torque nut 124 (shown in FIGS. 2A and 2B), the corresponding ferrule assembly (not shown), and the side of the body 126 that corresponds to torque nut 124. For example, the union compression fitting 120 may be symmetrical.

Referring again to FIGS. 2A-2C and 5A-5B, the ferrule-nut coefficient of friction $\mu_{fn}$ may be between the ferrule assembly 190 (FIG. 2C) and the torque nut 122 or 124. For example, the ferrule-nut coefficient of friction $\mu_{fn}$ may be between the nut bearing surface of ferrule assembly 190 and the shoulder of the tube passage way of the torque nut 122 or 124.

The ferrule-nut coefficient of friction $\mu_{fn}$ may be defined by an average coefficient of friction of each combination of surfaces—of the ferrule assembly 190 and of the torque nut 122 or 124—that are engaged with one another.

The shoulder of the tube passage way or a nut bearing surface of the ferrule assembly 190 may be coated in the coating 201 or a different lubricant to reduce the ferrule-nut coefficient of friction $\mu_{fn}$, as illustrated in FIG. 10. In an embodiment, every surface of the ferrule assembly is coated with the coating 201. In another embodiment, the shoulder of the tube passage way or the nut bearing surface of the ferrule assembly has a surface finish that is configured to provide the ferrule-nut coefficient of friction $\mu_{fn}$. For example the tube passage way or the nut bearing surface of the ferrule that engages the torque nut 122 or 124 may have surface finish of anywhere from 8 to 64 $R_a$, or anywhere from 16-32 $R_a$.

The ferrule-nut coefficient of friction $\mu_{fn}$ may be less than the projection-body coefficient of friction $\mu_{pb}$ to accentuate the abrupt increase in torque required to advance the torque nut 122 or 124. For example the projection-body coefficient of friction $\mu_{pb}$ may be anywhere from 10% to 500% greater than the ferrule-nut coefficient of friction $\mu_{fn}$ to accentuate of the abrupt increase. In an embodiment, projection-body coefficient of friction $\mu_{pb}$ is at least 10%, 20%, 50%, 100%, 200%, or 500% greater than the ferrule-nut coefficient of friction $\mu_{fn}$ to accentuate of the abrupt increase. In another embodiment, the projection-body coefficient of friction $\mu_{pb}$ is double the ferrule-nut coefficient of friction $\mu_{fn}$ to accentuate of the abrupt increase.

The ferrule-body coefficient of friction $\mu_{fb}$ may be between the ferrule assembly 190 (FIG. 2C) and the fitting body 126. For example, the ferrule-body coefficient of friction $\mu_{fb}$ may be between a body bearing surface of the ferrule assembly 190 and a ferrule bearing surface of the fitting body 126.

The ferrule-body coefficient of friction $\mu_{fb}$ may be defined by an average coefficient of friction of each combination of surfaces—of the ferrule assembly 190 and of the fitting body 126—that are engaged with one another.

The body bearing surface or the ferrule bearing surface may be coated in the coating 201 or a different lubricant to reduce the ferrule-body coefficient of friction $\mu_{fb}$, as illustrated in FIG. 10. In an embodiment, the body bearing surface or the ferrule bearing surface of the ferrule assembly has a surface finish that is configured to provide the ferrule-body coefficient of friction $\mu_{fb}$. For example, the body bearing surface or the ferrule bearing surface may have surface finish of anywhere from 8 to 64 $R_a$, or anywhere from 16-32 $R_a$.

The ferrule-body coefficient of friction $\mu_{fb}$ may be less than the projection-body coefficient of friction $\mu_{pb}$ to accentuate the abrupt increase in torque required to advance the torque nut 122 or 124. For example the projection-body coefficient of friction $\mu_{pb}$ may be anywhere from 10% to 500% greater than the ferrule-body coefficient of friction $\mu_{fb}$ to accentuate of the abrupt increase. In an embodiment, projection-body coefficient of friction $\mu_{pb}$ is at least 10%, 20%, 50%, 100%, 200%, or 500% greater than the ferrule-body coefficient of friction $\mu_{fb}$ to accentuate of the abrupt increase. In an embodiment, the ferrule-body coefficient of friction $\mu_{fb}$ may be equal to the projection-body coefficient of friction $\mu_{pb}$. For example, a minimal amount of lubrication, or no lubrication, may be between the body bearing surface of the ferrule assembly 190 and the ferrule bearing surface of the fitting body 126.

The axially deformable projections, axially inner threaded end portions, and ferrule assemblies described with reference to FIGS. 5C-7D and 9A-9M may have substantially the same coefficients of friction as the axially deformable projections, axially inner threaded end portions, and ferrule assemblies described with reference to FIGS. 2A-2C and 5A-5B.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A torque nut for a tube fitting assembly that includes a fitting body having an axially inner threaded end portion and a cavity opening to an axially inner end face of the fitting body for receiving an end of a tube, the fitting body having an axially inwardly facing shoulder radially offset from the axially inner threaded end portion, and a ferrule assembly for sealing to the tube, the ferrule assembly and fitting body, when axially urged towards one another, having cooperating surfaces for radially inwardly compressing the ferrule assembly around to tube to form a seal with the tube, the torque nut having an axially inner threaded end portion in threaded engagement with the axially inner threaded end portion of the fitting body, the torque nut having a tube passageway extending from an axially outer end face of the torque nut to an axially inner end face of the torque nut, the tube passageway allowing for passage of a tube through the torque nut and into the fitting body, and the tube passageway having a shoulder operative to cause the ferrule assembly to be urged toward the fitting body when the torque nut is tightened onto the fitting body;

wherein the torque nut has integral therewith an axially deformable projection protruding from the axially inner end face of the torque nut, which axially deformable projection is radially offset from the axially inner threaded end portion of the torque nut such that upon tightening of the torque nut on the fitting body, an axially leading end of the axially deformable projection will axially move into engagement with the axially inwardly facing shoulder of the fitting body to cause an abrupt increase in torque needed to tighten the torque nut on the fitting body after only partial axial deformation of the axially deformable projection relative to the axially inner end face of the torque nut, the abrupt increase in torque needed to tighten the nut indicating that the torque nut has been tightened on the fitting body to seal the ferrule assembly to the tube;

wherein the axially deformable projection has a thickness $T_d$ that is less than an axial length L of the axially deformable projection, thereby allowing the entire axially leading end to deform radially and axially relative to a deformable portion of the axially deformable projection as the axially deformable projection causes the abrupt increase in torque needed to tighten the torque nut;

wherein the deformable portion of the axially deformable projection is circumferentially continuous; and wherein the axially deformable projection is formed in one-piece with the first end of the torque nut, such that fluid cannot travel radially through any portion of the deformable portion.

2. A tube fitting assembly comprising:

a fitting body having an axially inner threaded end portion and a cavity opening to an axially inner end face of the fitting body for receiving an end of a tube, the fitting body having an axially inwardly facing shoulder radially offset from the axially inner threaded end portion;

a ferrule assembly for sealing to the tube, the ferrule assembly and fitting body, when axially urged towards one another, having cooperating surfaces for radially inwardly compressing the ferrule assembly around to tube to form a seal with the tube; and the torque nut of claim 1.

3. The tube fitting of claim 2, wherein the torque nut can be loosened to allow for removal of the tube from the fitting body and then remade up, with the axially leading end of the axially deformable projection again moving axially into engagement with the axially inwardly facing shoulder of the fitting body to cause an abrupt increase in torque needed to tighten the torque nut on the fitting body after further axial deformation of the axially deformable projection relative to the axially inner end face of the torque nut, the abrupt increase in torque needed to tighten the nut indicating that the torque nut again has been tightened sufficiently on the fitting body to seal the ferrule assembly to the tube.

4. The tube fitting of claim 2, wherein the fitting body has a stop collar forming the axially inwardly facing shoulder of the fitting body.

5. The torque nut of claim 1, wherein the abrupt increase in the torque is at least 20% greater than the increase in torque that otherwise would occur during tightening of the torque nut in the absence of the axially deformable projection.

6. The torque nut of claim 1, wherein the deformable portion is configured to plastically deform when compressed by an axially facing shoulder facing in a second direction to abut the axially leading end such that the deformable portion does not deform until the axially compressive force is at least 20% of an axial force necessary for the torque nut to axially urge at least one ferrule, between the fitting body and the torque nut, into a madeup position to sealingly engage an annular outer surface of a tube held within the fitting body; and wherein the axially deformable projection is integral with the nut after the deformable portion is plastically deformed into a first position.

7. The torque nut of claim 1, wherein the deformable portion of the axially deformable projection is radially and axially offset from the axially leading end, and wherein the deformable portion is configured to plastically deform before any other portion of the torque nut upon an axial force being applied to the axially leading end of the axially deformable projection.

8. The torque nut of claim 1, wherein axially leading end has a thickness greater than a thickness of the deformable portion of the axially deformable projection.

9. The torque nut of claim 8, wherein the axially deformable projection includes a radially outwardly extending flange that forms the axially leading end.

10. The torque nut of claim 1, wherein the axially leading end has a thickness less than the deformable portion of the axially deformable projection.

11. The torque nut of claim 1, wherein the entire axially leading end is configured to flare radially outward relative to the deformable portion of the axially deformable projection when the deformable portion of the axially deformable projection deforms into a first position.

12. The torque nut of claim 11, wherein the entire axially leading end is radially outward of the deformable portion in the first position.

13. The torque nut of claim 1, wherein the torque nut includes a sealing member at an axial end opposite the axially leading end, wherein the sealing member is configured to sealingly engage an annular outer surface of a tube held within the torque nut.

14. The tube fitting of claim 1, wherein the axially deformable projection is annularly continuous for forming a seal between the torque nut and the fitting body when the axially deformable projection is engaged with the fitting body.

15. The torque nut of claim 1, wherein the thickness $T_d$ of the axially deformable projection is 10-50% of the axial length L of the axially deformable projection.

16. A tube fitting assembly comprising:
a fitting body having an axially inner threaded end portion and a cavity opening to an axially inner end face of the fitting body for receiving an end of a tube, the fitting body having an axially inwardly facing shoulder radially offset from the axially inner threaded end portion;
a ferrule assembly for sealing to the tube, the ferrule assembly and fitting body, when axially urged towards one another, having cooperating surfaces for radially inwardly compressing the ferrule assembly around to tube to form a seal with the tube;
a torque nut having an axially inner threaded end portion in threaded engagement with the axially inner threaded end portion of the fitting body, the torque nut having a tube passageway extending from an axially outer end face of the torque nut to an axially inner end face of the torque nut, the tube passageway allowing for passage of a tube through the torque nut and into the fitting body, and the tube passageway having a shoulder operative to cause the ferrule assembly to be urged toward the fitting body when the torque nut is tightened onto the fitting body;
wherein the torque nut has integral therewith an axially deformable projection protruding from the axially inner end face of the torque nut, which axially deformable projection is radially offset from the axially inner threaded end portion of the torque nut in the same direction as the axially inwardly facing shoulder of the fitting body is radially offset from the axially inner threaded end portion of the fitting body such that upon tightening of the torque nut on the fitting body, an axially leading end of the axially deformable projection will axially move into engagement with the axially inwardly facing shoulder of the fitting body to cause an abrupt increase in torque needed to tighten the torque nut on the fitting body after only partial axial deformation of the axially deformable projection relative to the axially inner end face of the torque nut, the abrupt increase in torque needed to tighten the nut indicating that the torque nut has been tightened on the fitting body to seal the ferrule assembly to the tube;
wherein a projection-body coefficient of friction, between the axially leading end of the axially deformable projection and the axially inwardly facing shoulder of the fitting body, is greater than a threading coefficient of friction, between the axially inner threaded end portion of the torque nut and the axially inner threaded end portion of the fitting body, thereby accentuating the abrupt increase in torque needed to tighten the torque nut on the fitting body; and
wherein the axially leading end or the axially inwardly facing shoulder is coated in an anti-gallant or has a roughened surface, thereby increasing the projection-body coefficient of friction relative to the threading coefficient of friction.

17. The tube fitting assembly of claim 16, wherein the projection-body coefficient of friction is at least 50% greater than the threading coefficient of friction, preferably the projection body coefficient of friction is double the threading coefficient of friction.

18. The tube fitting assembly of claim 16, wherein the torque nut includes a lubricant that coats the axially inner threaded end portion of the torque nut and/or the fitting body includes a lubricant that coats the axially inner threaded end portion of the fitting body.

19. The tube fitting assembly of claim 16, wherein the axially deformable projection has a thickness $T_d$ that is 10-50% of an axial length L of the axially deformable projection, thereby allowing the entire axially leading end to deform radially and axially relative to a deformable portion of the axially deformable projection as the axially deformable projection causes the abrupt increase in torque needed to tighten the torque nut.

* * * * *